US011906166B2

(12) United States Patent
Armbruster et al.

(10) Patent No.: US 11,906,166 B2
(45) Date of Patent: Feb. 20, 2024

(54) INJECTOR DEVICE FOR AN ENGINE DEVICE, ENGINE DEVICE, AND AIR- AND/OR SPACECRAFT

(71) Applicant: Deutsches Zentrum fuer Luft-und Raumfahrt e.V., Cologne (DE)

(72) Inventors: Wolfgang Armbruster, Freiberg am Neckar (DE); Justin Hardi, Marbach am Neckar (DE); Michael Oschwald, Heilbronn (DE); Yannik Miene, Neuenstadt am Kocher (DE); Dmitry Suslov, Moeckmuehl (DE)

(73) Assignee: Deutsches Zentrum fuer Luft- und Koeln, Raumfahrt e.V., Cologne (DE)

( * ) Notice: Subject to any disclaimer, the term of this patent is extended or adjusted under 35 U.S.C. 154(b) by 90 days.

(21) Appl. No.: 17/450,897

(22) Filed: Oct. 14, 2021

(65) Prior Publication Data

US 2022/0106928 A1    Apr. 7, 2022

Related U.S. Application Data

(63) Continuation of application No. PCT/EP2020/060544, filed on Apr. 15, 2020.

(30) Foreign Application Priority Data

Apr. 15, 2019 (DE) .................... 10 2019 109 929.3
Apr. 18, 2019 (DE) .................... 10 2019 110 258.8

(51) Int. Cl.
*F23R 3/28* (2006.01)
*F02K 9/72* (2006.01)
*F02K 9/52* (2006.01)

(52) U.S. Cl.
CPC ................. *F23R 3/28* (2013.01); *F02K 9/52* (2013.01); *F02K 9/72* (2013.01);
(Continued)

(58) Field of Classification Search
CPC .............. F02K 9/52; F23R 2900/00013; F23R 2900/00014; F23R 3/28; F05D 2260/963; F05D 2260/964
See application file for complete search history.

(56) References Cited

U.S. PATENT DOCUMENTS 3,200,589 A   8/1965 Mower et al.
3,242,670 A   3/1966 Buswell
(Continued)

FOREIGN PATENT DOCUMENTS

DE   3432607   3/1986
EP   3034945   6/2016
(Continued)

*Primary Examiner* — Kyle Robert Thomas
(74) *Attorney, Agent, or Firm* — Lipsitz & McAllister, LLC

(57) ABSTRACT

An injector device for an engine device for introducing a fluidic, in particular a liquid, fuel and a fluid, in particular liquid, oxidizing agent into a combustion chamber of the engine device is provided. The injector device defines a longitudinal axis and comprises at least one first injection element, which is configured in the form of a first fluid channel for fluidically connecting a first collection space for the fluidic oxidizing agent and the combustion chamber, and at least one second injection element, which is configured in the form of a second fluid channel for fluidically connecting a second collection space for the fluidic fuel and the combustion chamber. At least one first resonator element is associated with the at least one first injection element and/or at least one second resonator element is associated with the at least one second injection element.

19 Claims, 13 Drawing Sheets

Figure 1:
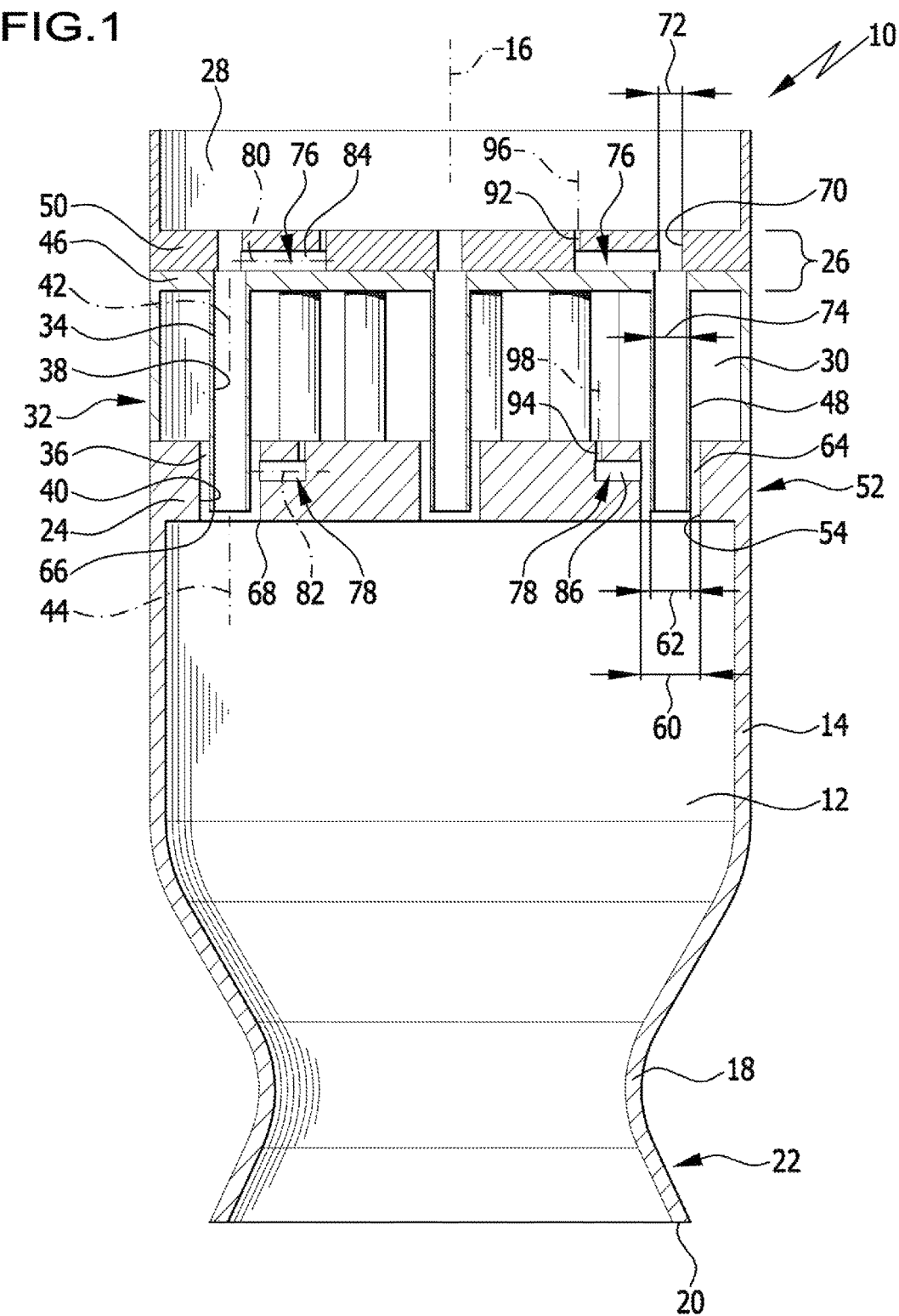

(52) U.S. Cl.
CPC .. *F05D 2260/963* (2013.01); *F05D 2260/964* (2013.01); *F23R 2900/00014* (2013.01)

(56) References Cited

U.S. PATENT DOCUMENTS

| | | |
|---|---|---|
| 3,483,698 A | 12/1969 | Lewis et al. |
| 4,100,993 A | 7/1978 | Feder |
| 5,353,598 A | 10/1994 | Huck et al. |
| 6,305,927 B1 | 10/2001 | Keller |
| 8,033,111 B2 | 10/2011 | Maeding |
| 8,661,822 B2 * | 3/2014 | Slobodyanskiy ......... F02C 7/24 60/725 |
| 8,789,372 B2 * | 7/2014 | Johnson .................... F23R 3/28 60/725 |
| 10,563,618 B2 | 2/2020 | Verplancke et al. |
| 2014/0284394 A1 | 9/2014 | James et al. |
| 2016/0363127 A1 * | 12/2016 | Lee ....................... G01M 15/14 |
| 2017/0058836 A1 | 3/2017 | Kernilis et al. |
| 2017/0211480 A1 * | 7/2017 | Myers ...................... F02C 7/22 |
| 2017/0226965 A1 | 8/2017 | Le Gonidec et al. |
| 2018/0163967 A1 | 6/2018 | Arellano et al. |

FOREIGN PATENT DOCUMENTS

| | | |
|---|---|---|
| FR | 2570129 | 3/1986 |
| FR | 2975440 | 11/2012 |
| JP | 2010236386 | 10/2010 |
| WO | 2005100858 | 10/2005 |
| WO | 2013004949 | 1/2013 |
| WO | 2016120571 | 8/2016 |
| WO | 2019067114 | 4/2019 |

* cited by examiner

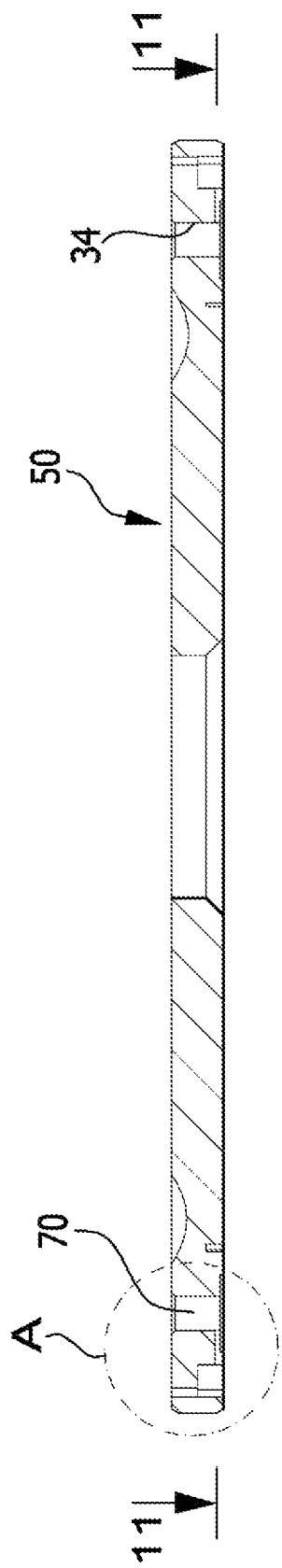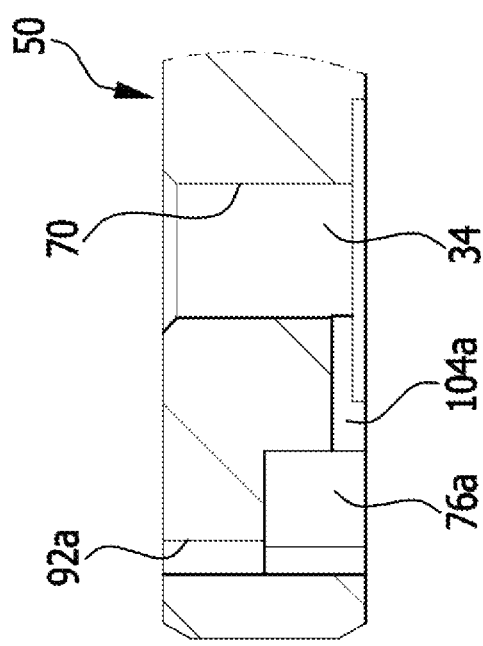

INJECTOR DEVICE FOR AN ENGINE DEVICE, ENGINE DEVICE, AND AIR- AND/OR SPACECRAFT

CROSS-REFERENCE TO RELATED APPLICATIONS

This application is a continuation of international application number PCT/EP2020/060544 filed on Apr. 15, 2020 and claims the benefit of German application number 10 2019 109 929.3 filed on Apr. 15, 2019 and of German application number 10 2019 110 258.8 filed on Apr. 18, 2019, which are incorporated herein by reference in their entirety and for all purposes.

FIELD OF THE INVENTION

The present invention relates to injector devices in general and more specifically an injector device for an engine device for introducing a fluidic, in particular liquid, fuel and a fluidic, in particular liquid, oxidizing agent into a combustion chamber of the engine device, which injector device defines a longitudinal axis and comprises at least one first injection element, which is configured in the form of a first fluid channel for fluidically connecting a first collection space for the fluidic oxidizing agent and the combustion chamber, and at least one second injection element, which is configured in the form of a second fluid channel for fluidically connecting a second collection space for the fluidic fuel and the combustion chamber.

Further, the present invention relates to engine devices in general and more specifically an engine device, in particular for an aircraft and/or spacecraft, which engine device comprises a combustion chamber with a nozzle and comprises an injection device arranged opposite the nozzle.

The present invention also relates to aircrafts and/or spacecrafts in general and more specifically an aircraft and/or spacecraft with an engine device and a fuel tank for accommodating a fluidic, in particular liquid, fuel.

Moreover, the present invention relates to methods for operating an engine device in general and more specifically a method for operating an engine device, in which method a fluidic, in particular liquid, fuel and a fluidic, in particular liquid, oxidizing agent is introduced with an injector device into a combustion chamber of the engine device, which injector device comprises at least one first injection element for fluidically connecting a first collection space for the fluidic oxidizing agent and the combustion chamber, and at least one second injection element for fluidically connecting a second collection space for the fluidic fuel and the combustion chamber.

BACKGROUND OF THE INVENTION

Engine devices of the kind described at the outset are known, e.g., in the form of liquid fuel rocket engines. In the case of these, a fuel, also referred to as a propellant, and an oxidizing agent, also referred to as an oxidizer, are injected into the combustion chamber and there are brought to reaction. Combustion chambers of such engines typically define a cylindrical volume that is delimited downstream by a convergent nozzle with sound passage in the smallest cross section. Upstream of the combustion chamber, the fuel and the oxidizing agent are injected, e.g., through so-called injector plates. In particular in the case of cryogenic propellants like liquid hydrogen, which is combined with an oxidizer in the form of liquid oxygen, or in the case of a combination of liquid methane with liquid oxygen, so-called coaxial injection elements are often used. The liquid oxygen is thereby injected centrally through a tube and the fuel at a high speed through a narrow annular gap, which is formed around the tube.

One of the greatest risks in the development and operation of an engine device, also referred to as a rocket engine, for a rocket is the occurrence of high-frequency, thermo-acoustic combustion instabilities. High-frequency combustion instabilities occur, for example, as a result of interaction of combustion chamber acoustics with fluctuations of the heat release rate of the flame created during combustion. Here, pressure fluctuations are amplified when the fluctuation component of the heat release rate is in phase with the pressure fluctuations.

Due to the high power density in a rocket combustion chamber, a small fraction of the converted chemical energy that is transmitted into the acoustic field is already sufficient to create rapidly growing high pressure amplitudes up to the order of magnitude of the static combustion chamber pressure. These pressure amplitudes can lead to mechanical or thermal failure of a combustion chamber wall delimiting the combustion chamber.

To solve this problem, for example, so-called baffles are inserted into the combustion chamber. These are, in particular, lengthened injection elements or cooled walls, which project from an injector plate that is passed through by the injection elements into the combustion chamber. The baffles are intended to break up the combustion chamber symmetry and reduce the acoustic energy of transversal modes by dissipation by means of turbulence upon flow over the walls.

Further, acoustic resonators like, for example, $\lambda/4$ resonators or Helmholtz resonators are known. These are installed in the combustion chamber wall to dampen pressure fluctuations due to combustion instabilities.

However, the described baffles are only capable of dampening transversal normal modes of the combustion chamber. They have no influence on longitudinal normal modes. In addition, they require extensive cooling, because the baffles project into the combustion chamber volume where temperatures of up to 3600 K prevail. Such baffles are typically developed according to the principle of "trial and error". The dampening properties thereof are thus hardly predictable, and the proof of their functionality requires expensive tests during the development process of an engine device.

With a known sound velocity in the resonator volume, acoustic resonators can theoretically be designed for any frequencies and thus all combustion chamber modes. However, installation of the resonators in the combustion chamber wall is problematic. In the case of regeneration cooling of the combustion chamber, the resonators must be installed between the cooling channels in the combustion chamber. However, very little installation space is available there, such that the cooling channels must be guided around the resonators in a complex manner. Typically, an efficiency of the cooling of the combustion chamber wall in the region of the resonators is thereby reduced. In addition, the production of the combustion chamber wall with resonators is significantly more complex than without.

Further, a problem of resonators in the combustion chamber wall is that the sound velocity in the resonator is not clearly defined. Combustion gases enter a resonator volume defined by the resonator through the opening of the resonators toward the combustion chamber. In dependence on the operating point of the engine, the flow field in the combustion chamber, and a position of the resonators in relation to the injection elements, different gas compositions may be present in the resonator. In addition, the temperature in the resonators is also unknown. The temperature is in a range between two extreme values that are determined by the combustion temperature on the one hand and a temperature of the cooling fluid in the cooling channels of the combustion chamber wall on the other hand. If the temperatures of the gas composition in the resonator are not known, the sound velocity in the resonators cannot be exactly predicted. Therefore, resonators in the combustion chamber wall can only be designed by elaborate trials and simulations of the combustion and cooling. In addition, it must be considered that the sound velocities in the combustion chamber and the resonators do not react uniformly to changes in an operating point of the engine. The resonators, strictly speaking, are thus designed only for one combustion chamber mode for a specific operating point. The resonators are not adapted at startup of the engine or during the shutdown process, which makes it possible for instabilities to occur even despite the resonators, which form damping elements.

SUMMARY OF THE INVENTION

In a first aspect of the invention, an injector device for an engine device is proposed for introducing a fluidic, in particular liquid, fuel and a fluidic, in particular liquid, oxidizing agent into a combustion chamber of the engine device. The injector device defines a longitudinal axis and comprises at least one first injection element, which is configured in the form of a first fluid channel for fluidically connecting a first collection space for the fluidic oxidizing agent and the combustion chamber, and at least one second injection element, which is configured in the form of a second fluid channel for fluidically connecting a second collection space for the fluidic fuel and the combustion chamber. At least one first resonator element is associated with the at least one first injection element and/or at least one second resonator element is associated with the at least one second injection element, and the at least one first resonator element is adapted to an eigenfrequency of the associated at least one first injection element and/or the at least one second resonator element is adapted to an eigenfrequency of the associated at least one second injection element.

In a second aspect of the invention, an engine device is proposed, in particular for an aircraft and/or a spacecraft. The engine device comprises a combustion chamber with a nozzle and comprises an injector device arranged opposite the nozzle. The injector device is configured to inject a fluidic, in particular liquid, fuel and a fluidic, in particular liquid, oxidizing agent into a combustion chamber of the engine device. The injector device defines a longitudinal axis and comprises at least one first injection element, which is configured in the form of a first fluid channel for fluidically connecting a first collection space for the fluidic oxidizing agent and the combustion chamber, and at least one second injection element, which is configured in the form of a second fluid channel for fluidically connecting a second collection space for the fluidic fuel and the combustion chamber. At least one first resonator element is associated with the at least one first injection element and/or at least one second resonator element is associated with the at least one second injection element, and the at least one first resonator element is adapted to an eigenfrequency of the associated at least one first injection element and/or the at least one second resonator element is adapted to an eigenfrequency of the associated at least one second injection element.

In a third aspect of the invention, an aircraft and/or spacecraft is proposed with an engine device and a fuel tank for accommodating a fluidic, in particular liquid, fuel. The engine device comprises a combustion chamber with a nozzle and comprises an injector device arranged opposite the nozzle. The injector device is configured to inject a fluidic, in particular liquid, fuel and a fluidic, in particular liquid, oxidizing agent into a combustion chamber of the engine device. The injector device defines a longitudinal axis and comprises at least one first injection element, which is configured in the form of a first fluid channel for fluidically connecting a first collection space for the fluidic oxidizing agent and the combustion chamber, and at least one second injection element, which is configured in the form of a second fluid channel for fluidically connecting a second collection space for the fluidic fuel and the combustion chamber. At least one first resonator element is associated with the at least one first injection element and/or at least one second resonator element is associated with the at least one second injection element, and the at least one first resonator element is adapted to an eigenfrequency of the associated at least one first injection element and/or the at least one second resonator element is adapted to an eigenfrequency of the associated at least one second injection element.

In a fourth aspect of the invention, a method for operating an engine device is proposed, in which method a fluidic, in particular liquid, fuel and a fluidic, in particular liquid, oxidizing agent is introduced with an injector device into a combustion chamber of the engine device, which injector device comprises at least one first injection element for fluidically connecting a first collection space for the fluidic oxidizing agent and the combustion chamber, and at least one second injection element for fluidically connecting a second collection space for the fluidic fuel and the combustion chamber, wherein acoustic natural vibrations in the at least one first injection element and/or wherein acoustic natural vibrations in the at least one second injection element are dampened.

BRIEF DESCRIPTION OF THE DRAWING FIGURES

Figure 2:
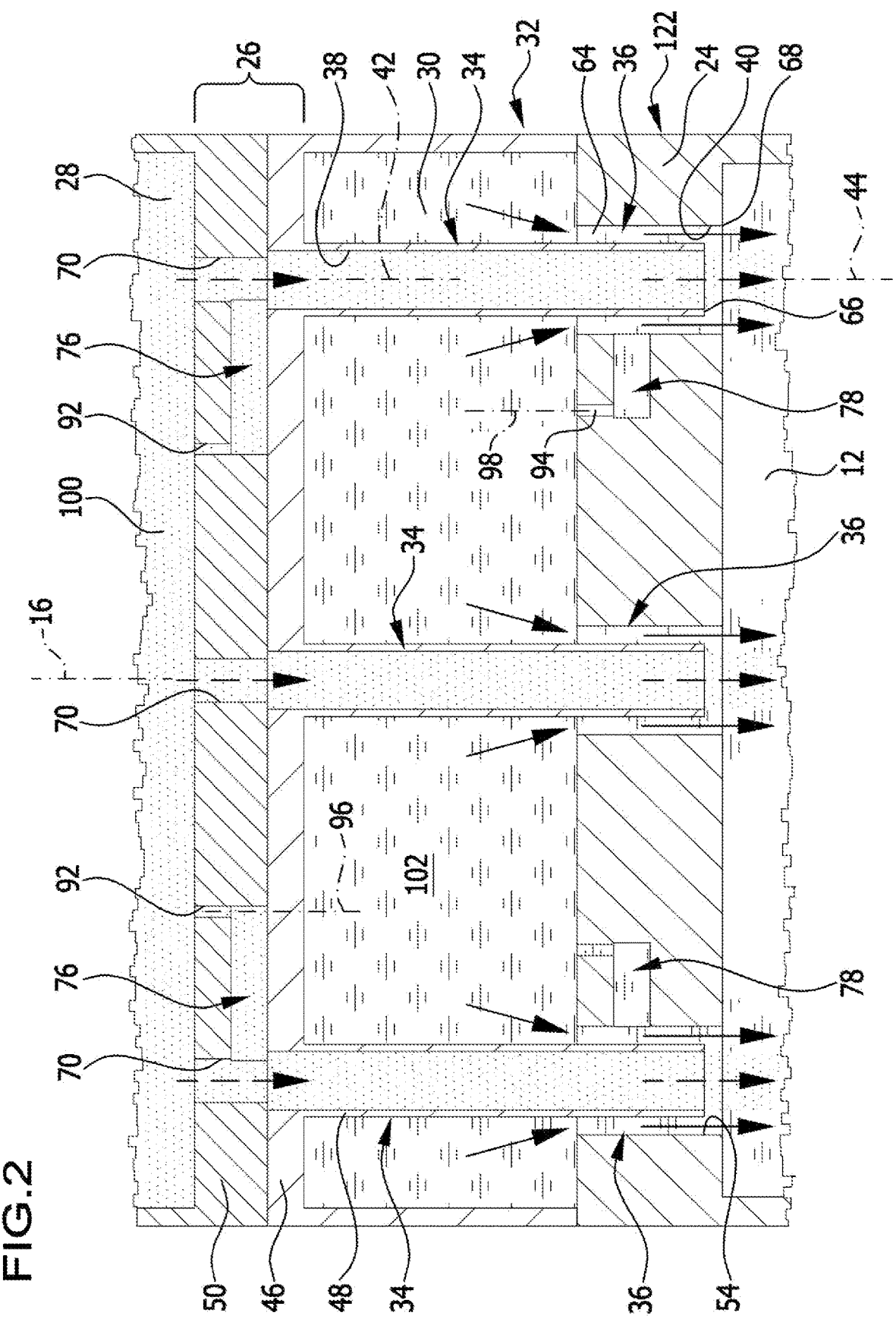
Figure 3:
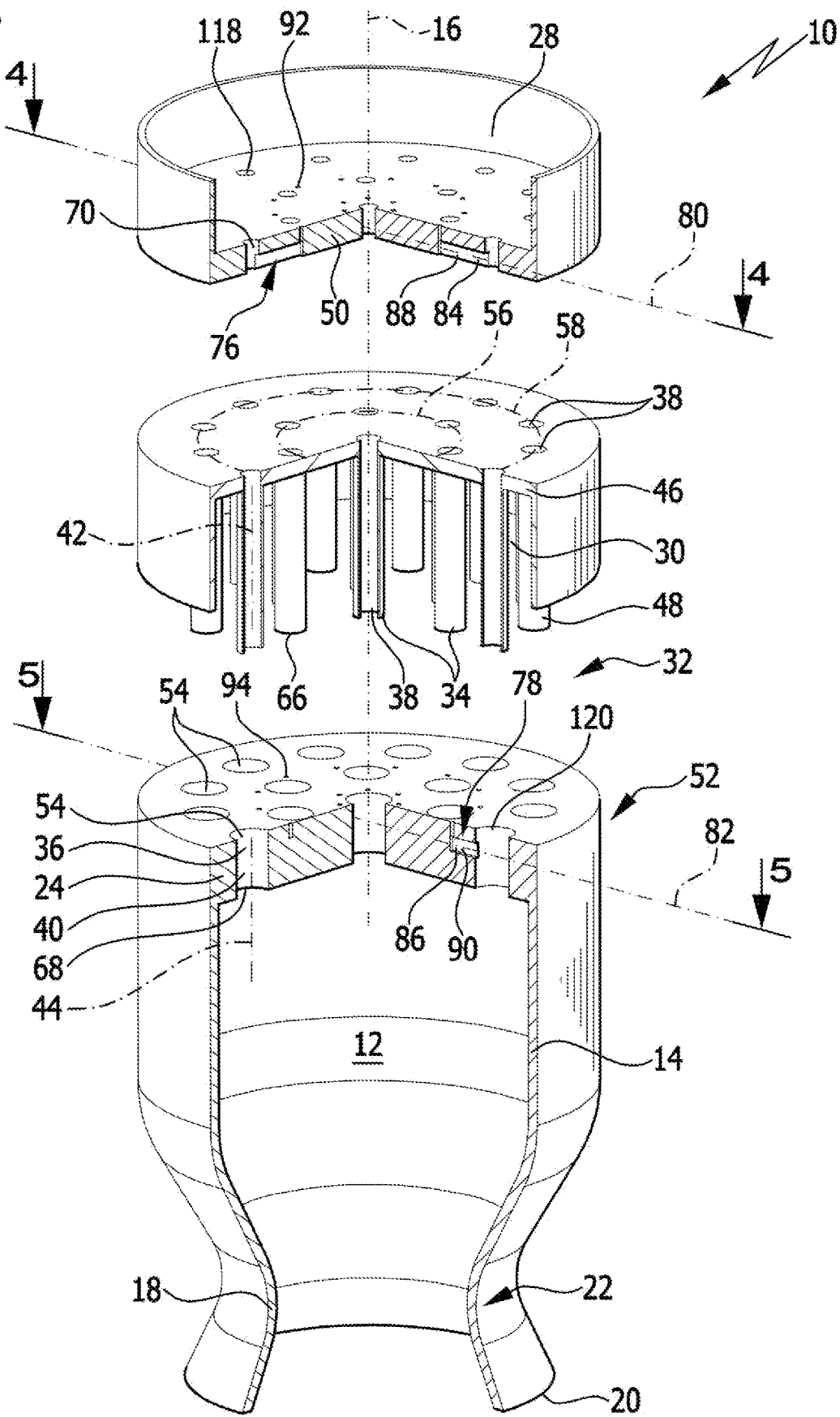
Figure 4:
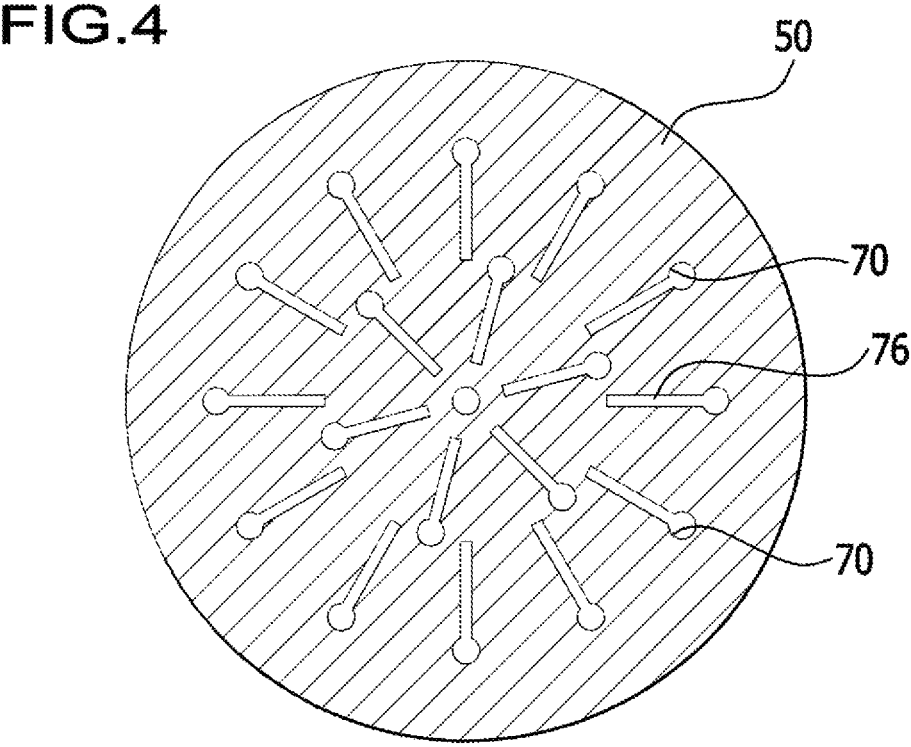
Figure 5:
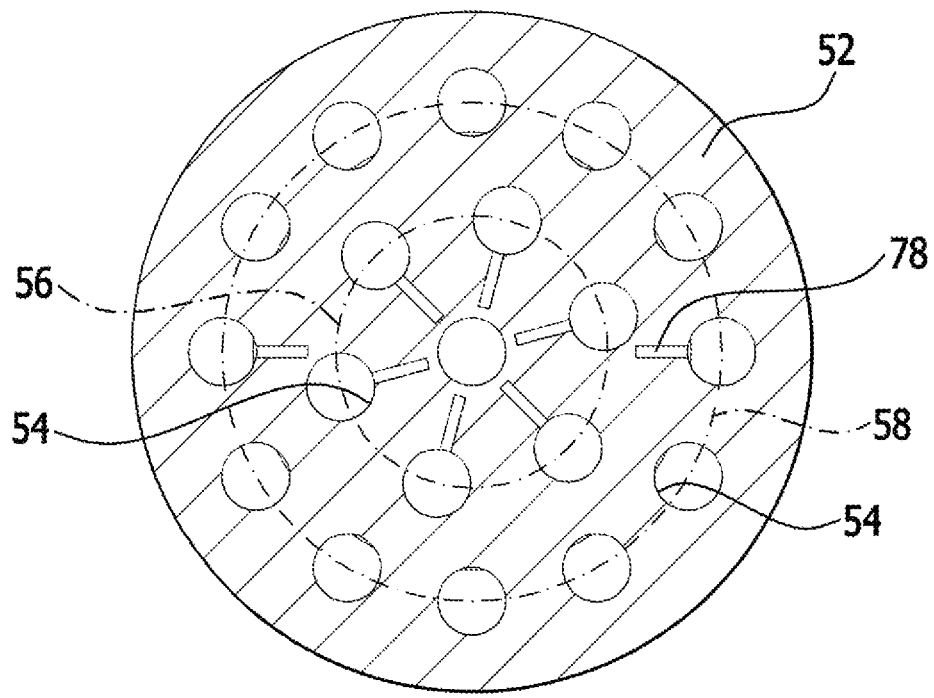
Figure 6:
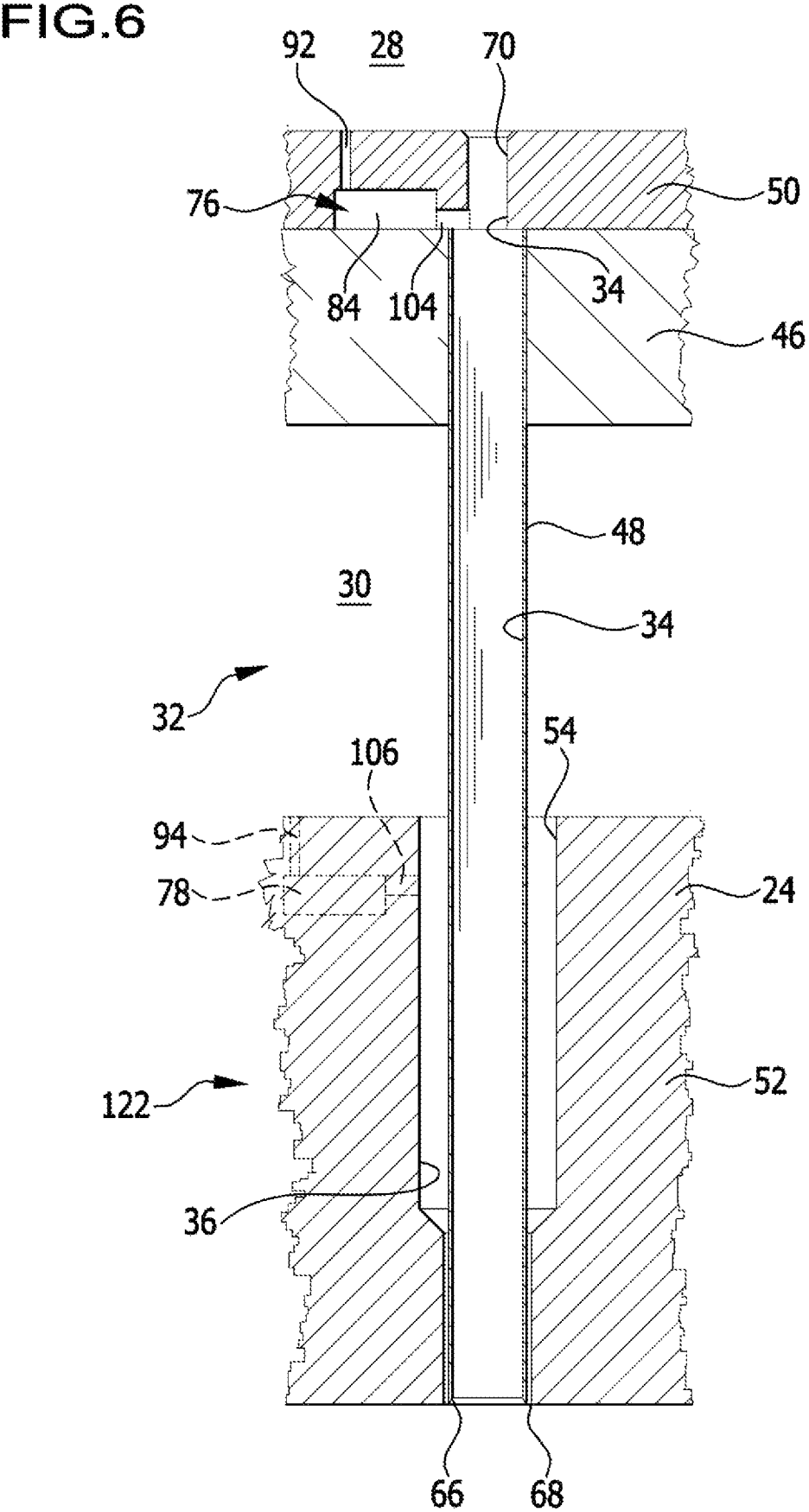
Figure 7:
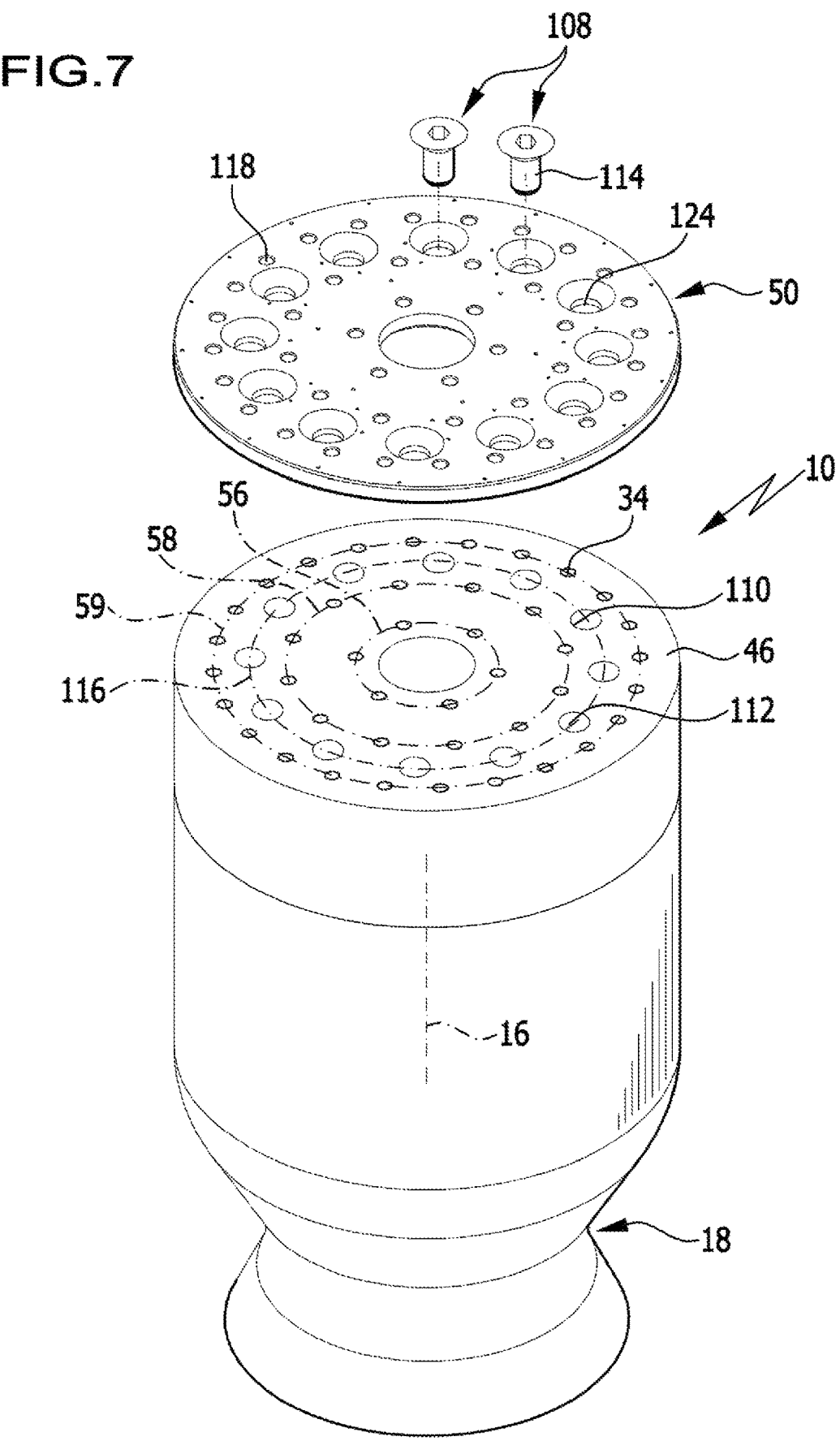
Figure 8:
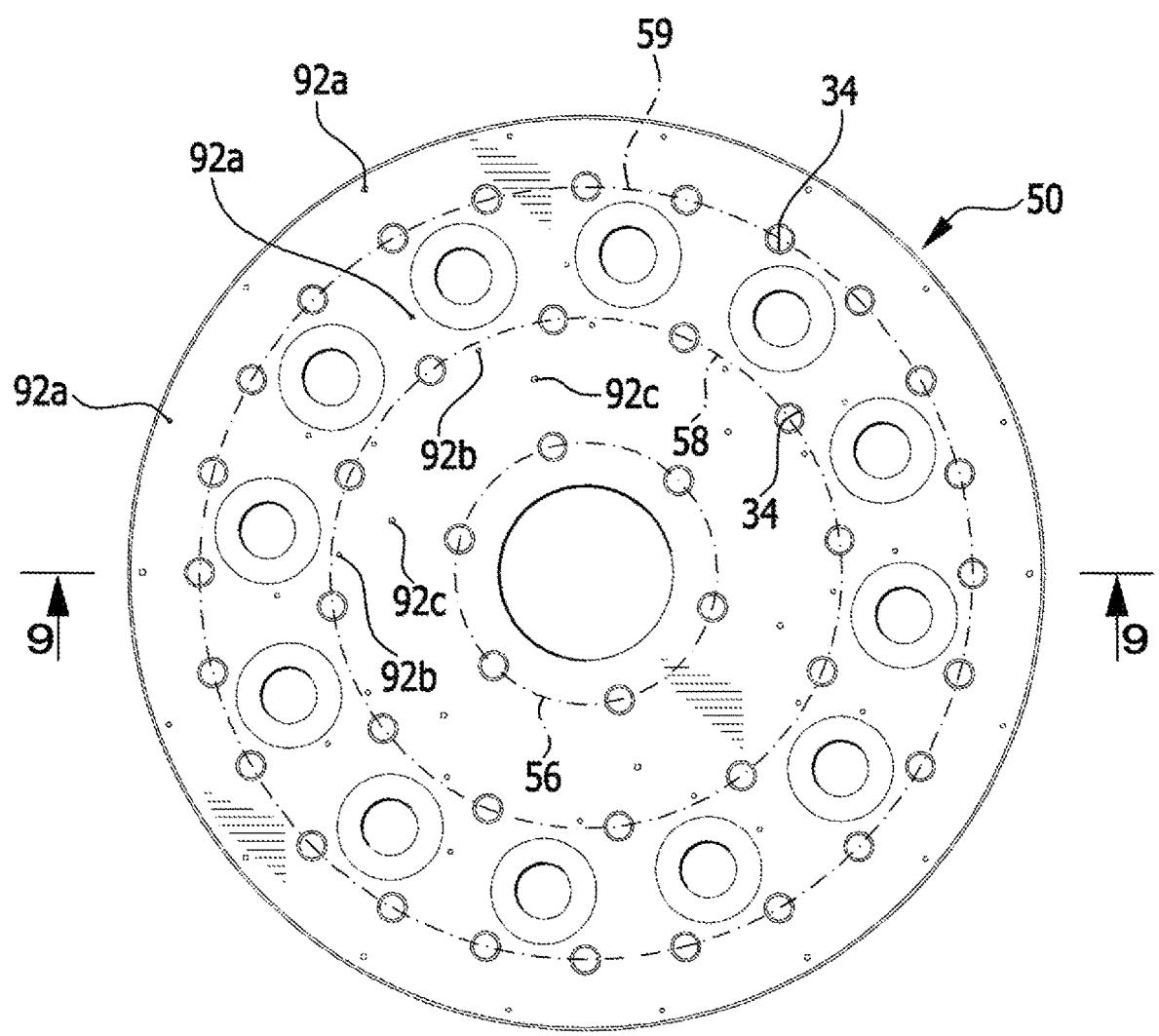
Figure 11:
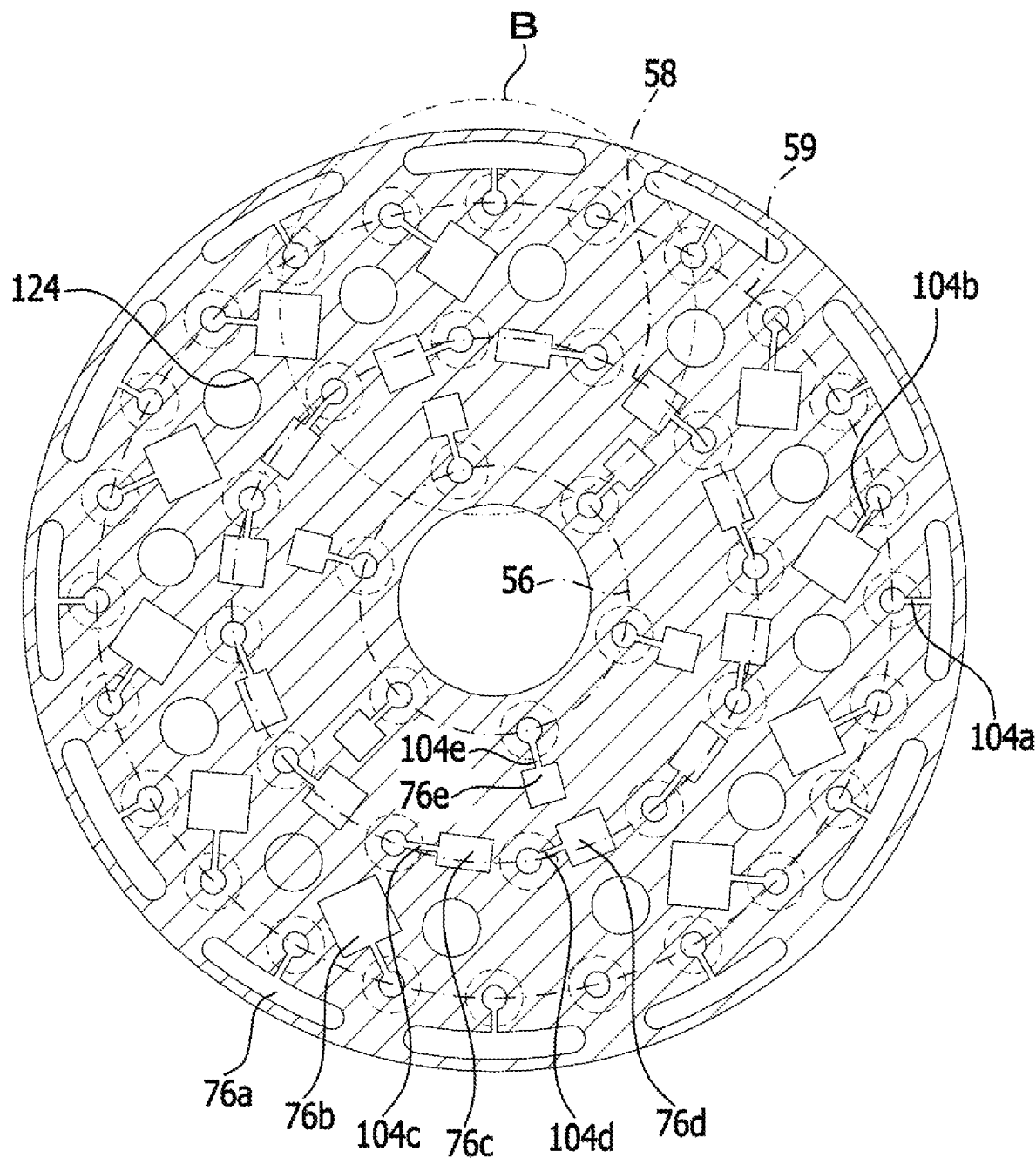
Figure 12:
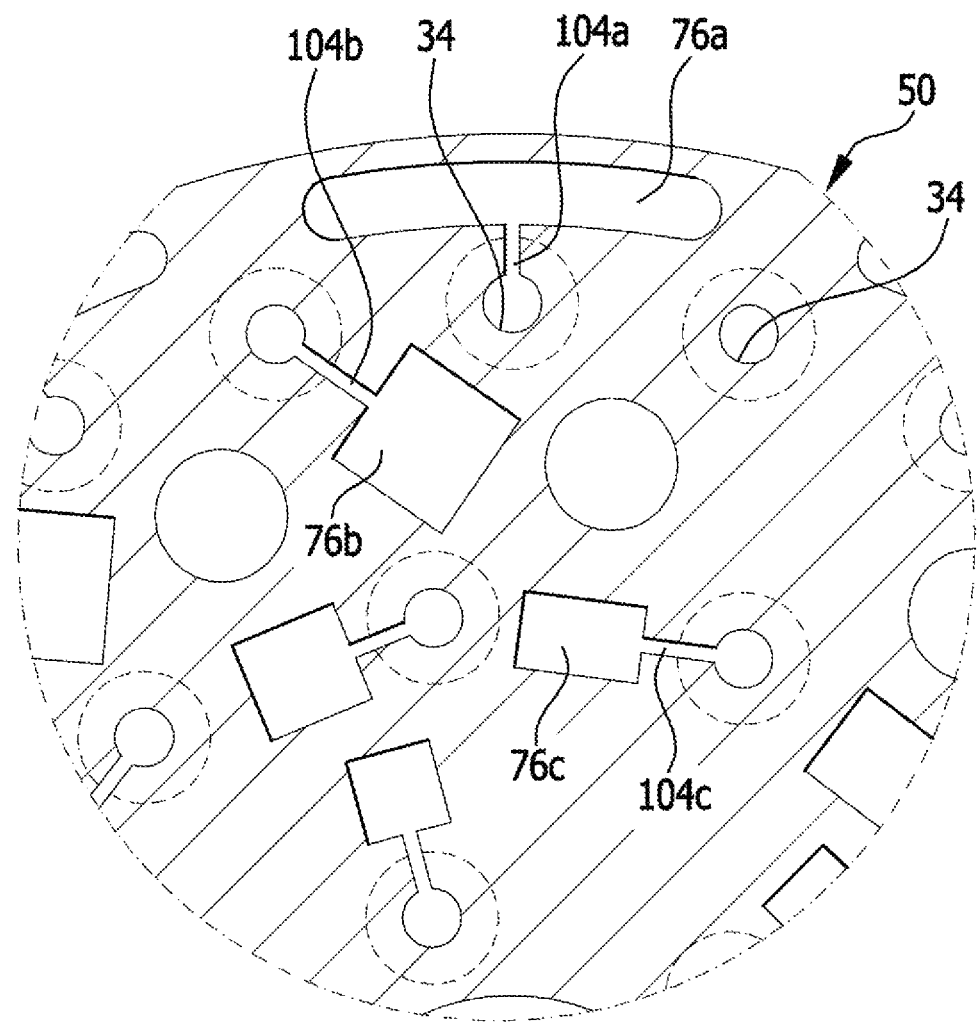
Figure 13:
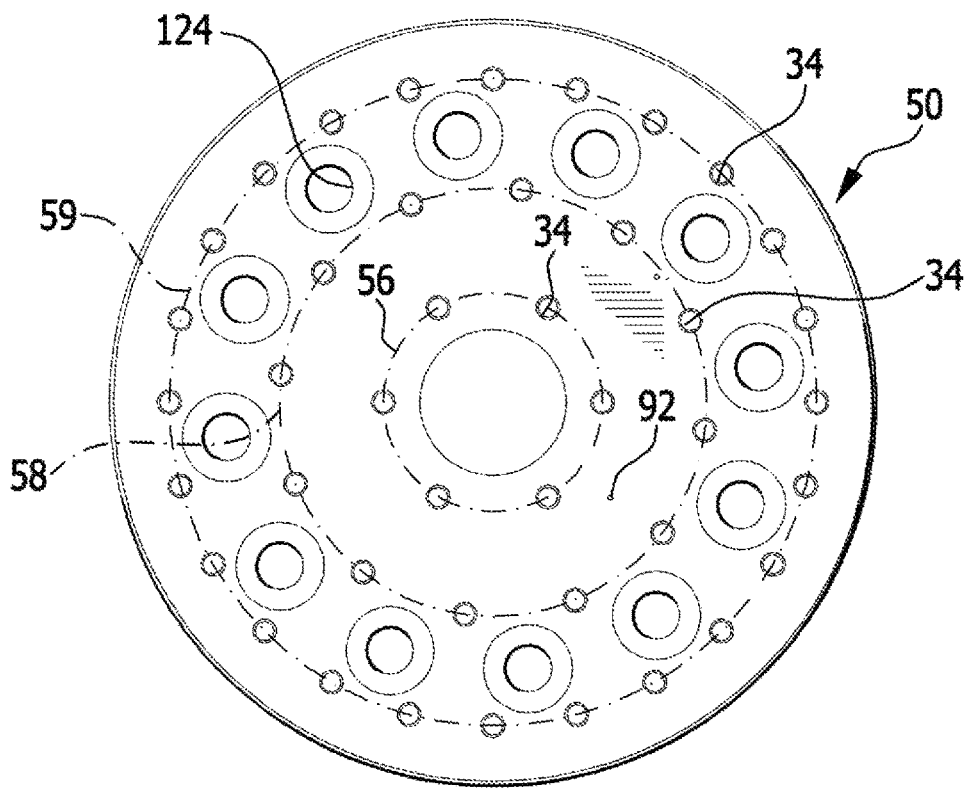
Figure 14:
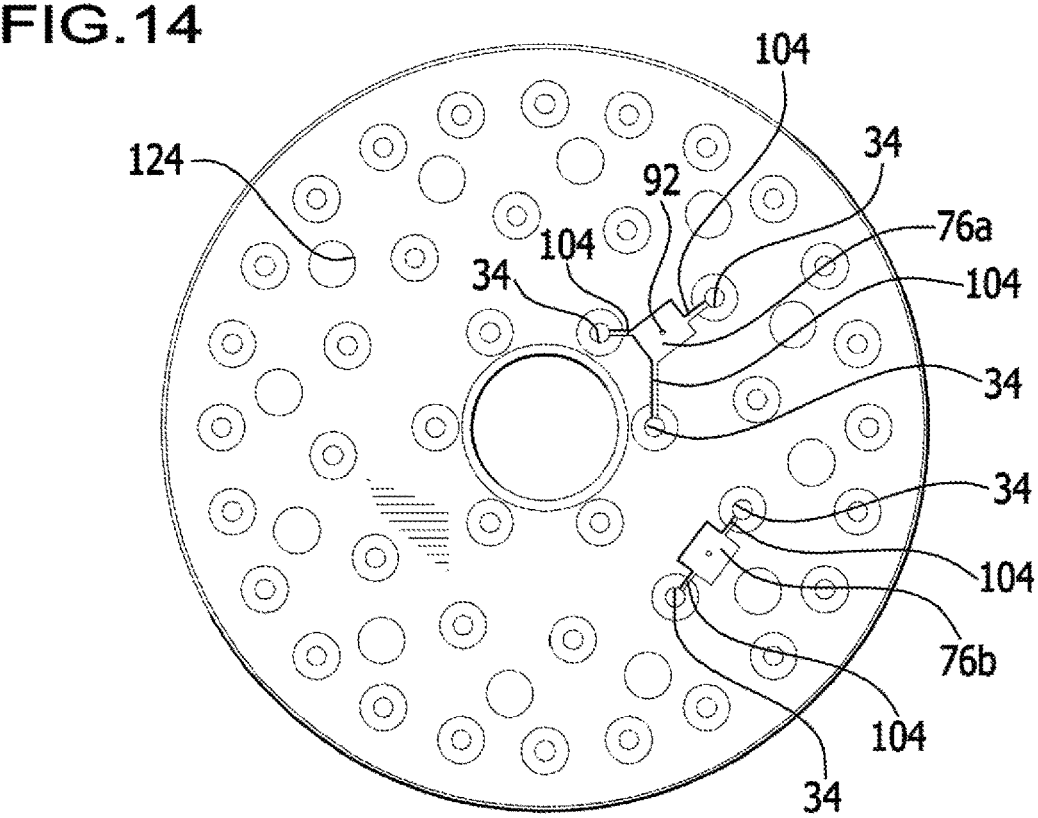
Figure 15:
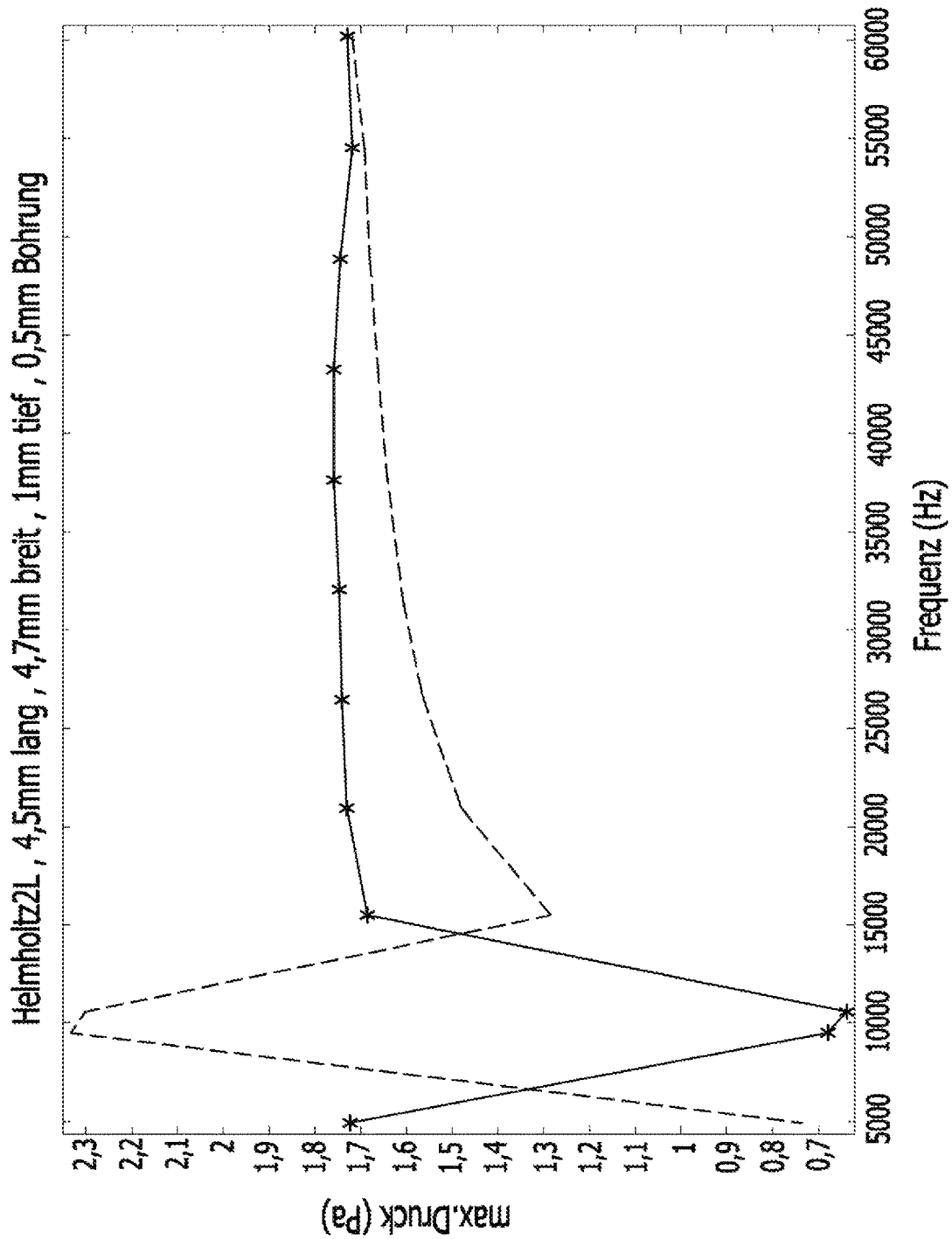
Figure 16:
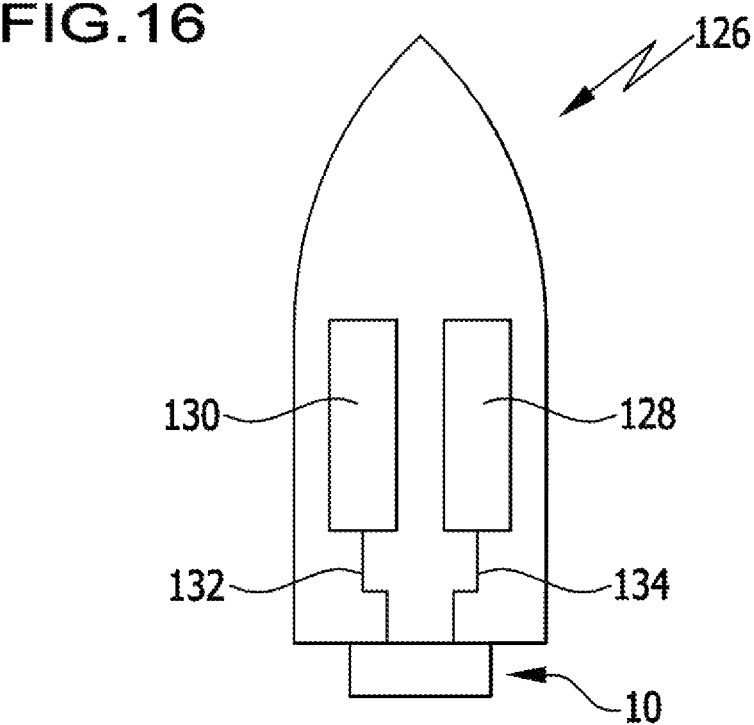

The foregoing summary and the following description may be better understood in conjunction with the drawing figures, of which:

The subsequent description of preferred embodiments of the invention serves in conjunction with the drawings for further explanation. In the drawings:

FIG. 1: shows a schematic longitudinal cut view of an embodiment of an engine device;

FIG. 2: shows an enlarged section view of the engine device from FIG. 1,

FIG. 3: shows a schematic perspective exploded depiction of the engine device from FIG. 1;

FIG. 4: shows a cut view along line 4-4 in FIG. 3;

FIG. 5: shows a cut view along line 5-5 in FIG. 3;

FIG. 6: shows a schematic longitudinal cut view of part of an embodiment of an injector device;

FIG. 7: shows a schematic, partially exploded depiction of an engine device with the throttle plate removed;

FIG. 8: shows a plan view of the throttle plate from FIG. 7;

FIG. 9: shows a cut view along line 9-9 in FIG. 8;

FIG. 10: shows an enlarged section view of the region A from FIG. 9;

FIG. 11: shows a cut view along line 11-11 in FIG. 9;

FIG. 12: shows an enlarged section view of the region B from FIG. 11;

FIG. 13: shows a schematic depiction of a plan view similar to FIG. 8 of a further embodiment of a throttle plate;

FIG. 14: shows a view of the embodiment of the throttle plate from FIG. 13 from the bottom;

FIG. 15: shows a representation of the dependence of a maximum pressure on the frequency for a first injection element for the oxidizing agent (solid curve) and for an associated resonator element in the form of a Helmholtz resonator (dashed curve), which is adapted to the second longitudinal eigenfrequency of the injection element;

FIG. 16: shows a schematic depiction of an embodiment of a spacecraft; and

Figure 17:
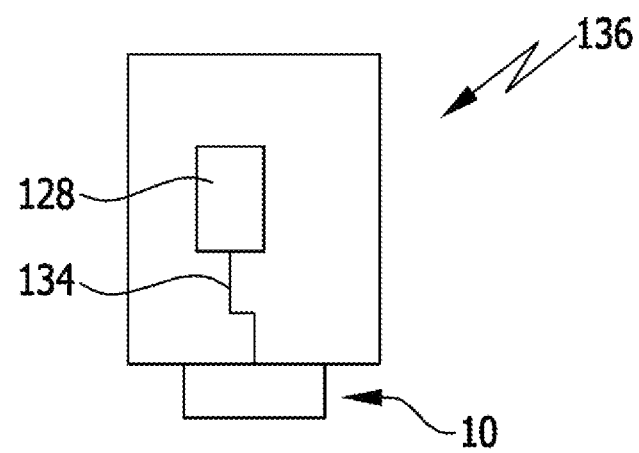

FIG. 17: shows a schematic depiction of an embodiment of an aircraft.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

The present invention relates to an injector device for an engine device for introducing a fluidic, in particular liquid, fuel and a fluidic, in particular liquid, oxidizing agent into a combustion chamber of the engine device, which injector device defines a longitudinal axis and comprises at least one first injection element, which is configured in the form of a first fluid channel for fluidically connecting a first collection space for the fluidic oxidizing agent and the combustion chamber, and at least one second injection element, which is configured in the form of a second fluid channel for fluidically connecting a second collection space for the fluidic fuel and the combustion chamber, wherein at least one first resonator element is associated with the at least one first injection element and/or wherein at least one second resonator element is associated with the at least one second injection element, and wherein the at least one first resonator element is adapted to an eigenfrequency of the associated at least one first injection element and/or wherein the at least one second resonator element is adapted to an eigenfrequency of the associated at least one second injection element.

The at least one first resonator element and the at least one second resonator element form damping elements in order to dampen possible pressure fluctuations in the respective injection element. Acoustics in the injection elements can be dampened in this way in order to prevent injector-coupled combustion instabilities in the combustion chamber. It is possible in principle to dampen either the injection of the fuel or the injection of the oxidizing agent or the injection of both the fuel and the oxidizing agent by means of corresponding resonator elements. If, in particular, a large number of injection elements are provided, different injector normal modes can also be dampened in a simple manner. This can be achieved by designing the first and/or second resonator elements correspondingly differently. In particular, a position of the respective injection element can hereby also be utilized. Thus, certain injection elements with which a coupling with tangential modes of the combustion chamber is expected can be appropriately dampened. Further, injection elements with which a coupling with a radial combustion chamber mode is expected can also be appropriately damped by the design of the associated resonator element or the associated resonator elements. Further, it is possible by means of the proposed association of the resonator elements with the injection elements to arrange same, in particular, spatially near the injection elements, for example in an injection head or an injector plate of the injector device. This is subjected to less thermal stress than the combustion chamber. As a result of the proposed configuration, it is no longer necessary, in particular in the case of injector-coupled instabilities, to provide resonators in the combustion chamber wall, thus simplifying a construction of the cooling channels in the combustion chamber wall. Both the construction and production of the combustion chamber overall can thereby be simplified. The association of the resonator elements with the injection elements enables, in particular, a spatial arrangement in the injector head, which is often made of materials like rust-free stainless steel or nickel-based alloys. This makes it possible, in particular, to form the injector head by means of additive manufacturing processes like, e.g., selective laser melting. The formation of acoustic resonators in the injector head is thereby simplified. Further, in principle, a dampening of annular injection elements is made possible in a simple manner. Finally, the discrete association of resonator elements with the injection elements makes it possible to retrofit them even in already existing combustion chambers, because the combustion chamber wall itself does not have to be altered. Merely changes in the region of the injector device are necessary. Thus, conventional combustion chambers can be retrofitted in a simple manner with the injector devices further developed in the proposed manner. Fluidic fuels and fluidic oxidizing agents are, in particular, liquid and/or gaseous fuels and liquid and/or gaseous oxidizing agents, respectively. Thus, for example, liquid fuel can be carried on board an aircraft, and the oxidizing agent can be collected from the atmosphere in the form of gaseous oxygen and be supplied to the engine device.

It is favorable if the at least one first resonator element is fluidically connected to the at least one first injection element and/or if the at least one second resonator element is fluidically connected to the at least one second injection element. This configuration makes it possible, in particular, that the fuel is able to enter into the at least one first resonator element and/or the oxidizing agent is able to enter into the at least one second resonator element. It can thereby be achieved, in particular, that nearly identical conditions, i.e., an identical pressure and an identical temperature, prevail in the injection element and in the associated resonator element. This simplifies, in particular, the design of the resonator elements, since ultimately only their volume has to be taken into account. The design of the resonator elements is greatly simplified as a result and primarily becomes independent of a momentary power of the combustion chamber during operation. A design of the respective resonator element for a desired frequency of the associated injection element that is to be dampened can be achieved with simple methods. Because the fluid properties are identical or substantially identical in the injector and in the resonator as a result of the design, a modal analysis is sufficient for determining a resonator geometry. A complex, elaborate, and uncertain combustion modeling and flow simulation in the combustion chamber are not necessary. As a result, for example, a validation of the functioning of the injector device and the combustion chamber can take place by means of simple cold gas experiments, because, due to its construction, the operation and function of the injector device is independent of the fluid used.

It is advantageous if the at least one first resonator element comprises a first resonator cavity, which defines a first resonator volume, and if a first resonator channel fluidically connects the at least one first injection element and the first resonator cavity, and/or if the at least one second resonator comprises a second resonator cavity, which defines a second resonator volume, and if a second resonator channel fluidically connects the at least one second injection element and the second resonator cavity. As a result of the fluidic connection of the resonator elements to the injection elements by the corresponding resonator channels, it can be achieved, in particular, that properties of the fuel in the respective injection element and in the associated resonator element and, accordingly, of the oxidizing agent in the respective injection element and in the associated resonator element are identical. A desired effect of the resonator elements is thus independent of a respective operating point of the engine device.

It is favorable if the first resonator channel defines a first resonator channel volume and if the first resonator channel volume is smaller than the first resonator volume and/or if the second resonator channel defines a second resonator channel volume and if the second resonator channel volume is smaller than the second resonator volume. In this way, it can be achieved, in particular, that an influence of the resonator channels is minimized to the properties of the resonator elements.

It is possible in principle to design the first resonator cavity or the second resonator cavity to have any form. Said resonator cavities can be configured in a simple manner if they are configured in the form of a hollow cylinder, a hollow cuboid, or a hollow sphere.

It is advantageous if the at least one first injection element defines a first injection element longitudinal axis and/or if the at least one second injection element defines a second injection element longitudinal axis. Fuels and/or oxidizing agents can be injected into the combustion chamber in a simple and defined manner, in particular by means of rectilinearly configured injection elements.

A simple construction of the injector device is made possible, in particular, by the fact that the first injection element longitudinal axis and/or the second injection element longitudinal axis extend in parallel to the longitudinal axis.

In accordance with a further preferred embodiment of the invention, provision may be made that the at least one first resonator element defines a first resonator element longitudinal axis and/or that the at least one second resonator element defines a second resonator element longitudinal axis. Resonator elements configured in that way are excellently suited for calculating their damping properties in a simple manner.

It is favorable if the first injection element longitudinal axis and the first resonator element longitudinal axis extend transversely, in particular perpendicularly, to one another and/or if the second injection element longitudinal axis and the second resonator element longitudinal axis extend transversely, in particular perpendicularly, to one another. Such a configuration enables, in particular, a compact arrangement of the resonator elements in relation to the injection elements, for example in an injector plate.

The at least one first injection element and the at least one second injection element are preferably arranged or formed coaxially to one another. This makes it possible, in particular, to inject the fuel into the combustion chamber through an annular channel that surrounds the injection element for the oxidizing agent. Such a coaxial injection of fuel and oxidizing agent enables a good mixing upon entry into the combustion chamber and thus a high combustion efficiency.

It is advantageous if the at least one first resonator element and the first collection space are fluidically connected to one another by way of a first flushing channel and/or if the at least one second resonator element and the second collection space are fluidically connected to one another by way of a second flushing channel. Providing such flushing channels has the advantage, in particular, that remaining compressed residual gases in the respective resonator element can be avoided. The flushing channels lead, in particular, to the fluid flowing through the injections elements also flowing at a low flow speed through the respective resonator. It can thereby be ensured, in particular, that the same conditions prevail in the respective resonator at any one time as in the injection element to be dampened. In particular, this has the great advantage that the same sound velocity in the injection element as in the resonator element forming a damping element makes the design of a geometry of the resonator element independent of the sound velocity and thus also independent of the respective fluid. Due to a comparatively low flow speed and Mach number in the injection element, these can be disregarded. Therefore, only the dimensions of the resonator elements have to be adapted to the respective injection elements. In other words, this means that when the injection element and the associated resonator element are only linked to one another by way of their geometry, the resonator elements no longer dampen the normal modes of the combustion chamber only for a defined operating point, but rather can dampen the eigenfrequencies of the injection elements for all imaginable operating states. A significantly more complex simulation of the combustion chamber acoustics with combustion can therefore be omitted and the resonator elements can be designed with an acoustic modal analysis. A fine adjustment of the resonator elements can thus also take place with a replacement fluid like, e.g., air. Expenditure on design can thereby be drastically reduced in comparison to hot gas tests in the case of resonator elements in the combustion chamber.

It is favorable if the at least one first flushing channel defines a first flushing channel longitudinal axis and/or if the at least one second flushing channel defines a second flushing channel longitudinal axis. Flushing channels of that kind can be formed in a simple manner, for example by bores.

It is advantageous if the first flushing channel longitudinal axis and the longitudinal axis extend in parallel or substantially in parallel to one another and/or if the second flushing channel longitudinal axis and the longitudinal axis extend in parallel or substantially in parallel to one another. Such a design enables a simple structure and thus a simple production of the injector device.

In order to minimize an influence of the flushing channels on the resonator elements, it is favorable if a first flushing channel cross-sectional area defined by the at least one first flushing channel is smaller than a first resonator channel cross-sectional area defined by the first resonator channel and/or if a second flushing channel cross-sectional area defined by the at least one second flushing channel is smaller than a second resonator channel cross-sectional area defined by the second resonator channel.

It is favorable if the at least one first resonator element and/or if the at least one second resonator element is configured in the form of a Helmholtz resonator or in the form of a $\lambda/4$ resonator. Resonator elements of that kind can be formed in a simple manner and adapted to eigenfrequencies of the associated injection elements.

It is advantageous if the at least one first resonator element is associated with at least one first injection element and/or if the at least one second resonator element is associated with at least one second injection element. This configuration makes it possible, in particular, to associate a resonator with not only one, but two, three or more injection elements. A structure of the injector device can thereby be simplified, because, for example, only one single resonator element is required to associate same with two or more injection elements.

In order to enable an optimized reaction of fuel and oxidizing agent in the combustion chamber, it is advantageous if the injector device comprises a plurality of first injection elements and/or a plurality of second injection elements. In particular, the number of first injection elements may match the number of second injection elements.

It is favorable if the first resonator elements associated with the plurality of first injection elements are adapted to different eigenfrequencies of the plurality of first injection elements and/or if the second resonator elements associated with the plurality of second injection elements are adapted to different eigenfrequencies of the plurality of second injection elements. This makes it possible, in particular, to specifically dampen injection elements. For example, the resonator elements may be adapted to certain eigenfrequencies of the injection element that preferably couple with longitudinal modes of the combustion chamber. Others can be adapted to eigenfrequencies that couple with transversal or radial modes of the combustion chamber. A development of very strong injector-coupled pressure fluctuations in the combustion chamber can thus be effectively suppressed. By damping the respective injection elements, flame oscillations in the combustion chamber with the acoustic eigenfrequencies of the injection elements are prevented. Where no fluctuations in heat release occur, they also cannot couple with combustion chamber modes and thereby lead to high-frequency, thermoacoustic combustion instabilities in the combustion chamber, which arise as a result of the injector coupling.

It is favorable if the first resonator elements have different forms and/or different first resonator volumes and/or if the second resonator elements have different forms and/or different second resonator volumes. A configuration of that kind makes it possible, in particular, to dampen, in a simple manner, different eigenfrequencies of the injection elements with which the resonator elements are associated. It is, of course, also possible in principle to configure all first and/or second resonator elements identically.

In accordance with a further preferred embodiment of the invention, provision may be made that the at least one first resonator element is arranged or formed in the region of an inlet of the at least one first injection element facing in the direction toward the first collection space and/or if the at least one second resonator element is arranged or formed in the region of an inlet of the at least one second injection element facing in the direction toward the second collection space. Such an arrangement of the resonator elements enables, in particular, a particularly compact structure of the injector device. In particular, a length of optionally provided flushing channels can be minimized in a simple manner.

It is favorable if the injector device comprises a first injector plate and a second injector plate, if the at least one first resonator elements are arranged or formed in the first injector plate, and/or if the at least one second resonator elements are arranged or formed in the second injector plate. Such an arrangement of the resonator elements makes it possible, in particular, to exchange the injector plates in known engine devices and thus to retrofit the injector device with the resonator elements in a simple manner.

A simple structure of the injector device can be achieved, in particular, by the first injector plate and the second injector plate being arranged or formed in parallel to one another. In particular, they may be arranged or formed transversely to the longitudinal axis.

A particularly compact structure of the injector device can be achieved, in particular, by the second collection space being arranged or formed between the first injector plate and the second injector plate.

It is favorable if the first injector plate is configured in the form of a throttle plate and if associated with the at least one first injection element in the region of its inlet is a first throttle element, which defines a smaller flow cross section than the at least one first injection element, and if the first throttle element is arranged or formed in or on the throttle plate. This configuration enables, in particular, a compact structure of the injector device. For example, said injector device can be formed by means of a generative manufacturing process.

The production of the injector device can be simplified, in particular, by the at least one first injection element being configured in the form of a bore of the throttle plate.

The at least one first injection element is favorably arranged on a plate-shaped injector element holder or configured in the form of an injector sleeve. First injection elements of that kind can be produced in a simple manner.

A compact structure of the injector device can be achieved, in particular, by the injector element holder abutting in surface-to-surface contact against the first injector plate on the one hand and delimiting the second collection space on the other hand.

The at least one second injection element is advantageously arranged or formed on or in an injection head. The injection head may form, in particular, a boundary of the combustion chamber, such that a compact structure of an engine device is made possible.

The injection head advantageously forms a face wall, which delimits the combustion chamber and is arranged or formed opposite a nozzle of the combustion chamber. The nozzle of the combustion chamber serves as an outlet for the reaction products, thereby determining an advance of the engine device.

The at least one second injection element can be formed in a simple manner if it is configured in the form of a bore of the injection head.

A second throttle element can be formed in a simple manner by the at least one second injection element tapering in cross section in a single stage to form the second throttle element.

The invention further relates to an engine device, in particular for an aircraft and/or a spacecraft, which engine device comprises a combustion chamber with a nozzle and comprises an injector device arranged opposite the nozzle, wherein the injector device is configured to inject a fluidic, in particular liquid, fuel and a fluidic, in particular liquid, oxidizing agent into a combustion chamber of the engine device, which injector device defines a longitudinal axis and comprises at least one first injection element, which is configured in the form of a first fluid channel for fluidically connecting a first collection space for the fluidic oxidizing agent and the combustion chamber, and at least one second injection element, which is configured in the form of a second fluid channel for fluidically connecting a second collection space for the fluidic fuel and the combustion chamber, wherein at least one first resonator element is associated with the at least one first injection element and/or wherein at least one second resonator element is associated with the at least one second injection element, and wherein the at least one first resonator element is adapted to an eigenfrequency of the associated at least one first injection element and/or wherein the at least one second resonator element is adapted to an eigenfrequency of the associated at least one second injection element.

Equipping an engine device with such an injector device has, in particular, the advantages described above in conjunction with preferred embodiments of injector devices.

The engine device is preferably configured in the form of a rocket engine. Such a rocket engine can be used, in particular, to propel a rocket.

It is advantageous if the combustion chamber comprises a face wall opposite the nozzle and if at least part of the injector device is arranged or formed in the face wall. Such an engine device can, in particular, be configured compactly.

The engine device favorably comprises at least one collection space, which is delimited by a collection space face wall. For example, the engine device may have a respective separate collection space for the fuel and the oxidizing agent. The collection space face wall may, in particular, be arranged or formed extending transversely to a longitudinal axis defined by the engine device. For example, a collection space face wall may be formed by the face wall opposite the nozzle and delimit a collection space for the fuel. A second collection space face wall of the collection space for the fuel may be formed, e.g., by the injector element holder described above.

The invention further relates to an aircraft and/or spacecraft with an engine device and a fuel tank for accommodating a fluidic, in particular liquid, fuel, wherein the engine device comprises a combustion chamber with a nozzle and comprises an injector device arranged opposite the nozzle, wherein the injector device is configured to inject a fluidic, in particular liquid, fuel and a fluidic, in particular liquid, oxidizing agent into a combustion chamber of the engine device, which injector device defines a longitudinal axis and comprises at least one first injection element, which is configured in the form of a first fluid channel for fluidically connecting a first collection space for the fluidic oxidizing agent and the combustion chamber, and at least one second injection element, which is configured in the form of a second fluid channel for fluidically connecting a second collection space for the fluidic fuel and the combustion chamber, wherein at least one first resonator element is associated with the at least one first injection element and/or wherein at least one second resonator element is associated with the at least one second injection element, and wherein the at least one first resonator element is adapted to an eigenfrequency of the associated at least one first injection element and/or wherein the at least one second resonator element is adapted to an eigenfrequency of the associated at least one second injection element.

Providing such an engine device has the advantage, in particular, that the aircraft and/or spacecraft also has the advantages that result from the particular design of the engine device.

The fuel tank is preferably configured to accommodate liquid hydrogen or liquid methane. This makes it possible, for example, to propel the aircraft and/or spacecraft by means of a fuel mixture that is formed either by a combination of liquid hydrogen and liquid oxygen or by a combination of liquid methane and liquid oxygen.

Further, it is favorable if the aircraft and/or spacecraft comprises an oxidizing agent tank for accommodating a fluidic oxidizing agent. In particular, the fluidic oxidizing agent may be a liquid oxidizing agent, for example liquid oxygen. Providing an oxidizing agent tank makes it possible, in particular, to operate the aircraft and/or spacecraft in outer space where no oxygen-containing atmosphere is available from which gaseous oxygen can be collected as an oxidizing agent.

The invention further relates to a method for operating an engine device is proposed, in which method a fluidic, in particular liquid, fuel and a fluidic, in particular liquid, oxidizing agent is introduced with an injector device into a combustion chamber of the engine device, which injector device comprises at least one first injection element for fluidically connecting a first collection space for the fluidic oxidizing agent and the combustion chamber, and at least one second injection element for fluidically connecting a second collection space for the fluidic fuel and the combustion chamber, wherein acoustic natural vibrations in the at least one first injection element and/or wherein acoustic natural vibrations in the at least one second injection element are dampened.

Proceeding in the described manner has the advantage, in particular, that the development of very strong injector-coupled pressure fluctuations in the combustion chamber are effectively suppressed. By damping the respective injection elements, flame oscillations in the combustion chamber with the acoustic eigenfrequencies of the injection elements are prevented. Where no fluctuations in heat release occur, they also cannot couple with combustion chamber modes and thereby lead to high-frequency, thermoacoustic combustion instabilities in the combustion chamber, which arise as a result of the injector coupling.

Schematically depicted in FIG. 1 is a first embodiment of an engine device 10.

The engine device 10 comprises a combustion chamber 12 that is delimited by a combustion chamber wall 14.

The engine device 10 is of substantially rotationally symmetrical configuration in relation to a longitudinal axis 16.

The combustion chamber 12 is of substantially hollow-cylindrical configuration and tapers up to a neck 18, starting from which an outlet 20 expanding in cross section is formed. The neck 18 defines a convergent nozzle 22 with sound passage in the narrowest cross section that is specified by the neck 18.

Arranged opposite the outlet 20 is a face wall 24 delimiting the combustion chamber 12. Arranged in parallel to the face wall 24 and at a distance therefrom is a second dividing wall 26 that on a side remote from the combustion chamber 12 delimits a first collection space 28 for accommodating a fluidic oxidizing agent 100. The second face wall 26 has a side face that points toward the combustion chamber 12 and delimits a second collection space 30 for accommodating a fluidic fuel 102. The second collection space 30 is also delimited by the face wall 24, namely with a side face thereof that points away from the combustion chamber 12.

For introducing the fluidic fuel and the fluidic oxidizing agent into the combustion chamber 12, the engine device 10 comprises an injector device 32.

The injector device 32 defines an injector device longitudinal axis that coincides with the longitudinal axis 16. Further, the injector device 32 comprises a plurality of first injection elements 34 and a plurality of second injection elements 36. The first injection elements 34 are configured in the form of a first fluid channel 38 for fluidically connecting the first collection space 28 and the combustion chamber 12. The second injection elements 36 are configured in the form of second fluid channels 40 for fluidically connecting the second collection space 30 and the combustion chamber 12.

The first injection elements 34 define first injection element longitudinal axes 42. The second injection elements 36 define second injection element longitudinal axes 44.

The first injection elements 34 are arranged on a plate-shaped injector element holder and are configured in the form of an injector sleeve 48. The injector element holder 46 delimits the second collection space 30 and abuts with a second side face in surface-to-surface contact against an injector plate 50.

The injector element holder 46 and the injector plate 50 together form the dividing wall 26 that separates the collection spaces 28 and 30 from one another.

In a further embodiment, the injector element holder 46 and the injector plate 50 are configured as a single unit in one piece.

The face wall 24 forms an injection head 52. The second injection elements 36 are arranged and formed on or in the injection head 52.

The second injection elements 36 are configured in the form of bores 54 in the face wall 24. Bore longitudinal axes thereof extend in parallel to the longitudinal axis 16.

One of the bores 54 is formed coaxially to the longitudinal axis 16. The further bores 54 are arranged on two circles 56 and 58 that are concentric to the longitudinal axis.

An inner diameter 60 of the bores 54 is slightly larger than an outer diameter 62 of the injector sleeve 48 so that an annular space 64 delimited by the bore 54 on the one hand and the injector sleeve 48 on the other hand is formed, which defines the second fluid channel 40 for the fluidic fuel 102.

A length of the injector sleeve 48 is selected such that a free end 66 thereof ends in the region of a free end 68 of the bores 54 that points toward the combustion chamber 12.

The injector plate 50 is provided with a number of bores 70 corresponding to the number of bores 54, the inner diameter 72 of which is smaller than an inner diameter 74 of the injector sleeves 48. The bores 70 and 54 thus form a first fluid channel 38 that expands in a single stage in the transition region between the injector plate 50 and the injector holder 46.

The injector device 32 further comprises a plurality of first resonator elements 76 and a plurality of second resonator elements 78. The first resonator elements 76 are each associated with a first injection element 34, the second resonator elements 78 each with a second injection element 36.

The first resonator elements 76 are each adapted to an eigenfrequency of the associated first injection element 34. The second resonator elements 78 are each adapted to an eigenfrequency of the associated second injection element 36.

In the embodiment of the injector device 32 depicted in FIGS. 1 to 5, the first resonator elements 76 define first resonator element longitudinal axes 80 and the second resonator elements 78 define second resonator element longitudinal axes 82.

The first resonator element longitudinal axes 80 together span a plane extending transversely to the longitudinal axis 16, said plane extending in parallel to a plane defined by the second resonator element longitudinal axes 82.

The first injection element longitudinal axes 42 and the first resonator element longitudinal axes 80 extend transversely, namely perpendicularly, to one another. The second injection element longitudinal axes 44 and the respectively associated second resonator element longitudinal axes 82 also extend transversely, namely perpendicularly, to one another.

The first resonator elements 76 are fluidically connected to the associated first injection element 34. Likewise, the second resonator elements 78 are fluidically connected to the respectively associated second injection element 36.

The first resonator elements 76 each define a first resonator cavity 84, which defines a first resonator volume. The second resonator elements 78 each define a second resonator cavity 86.

In the embodiment of the injector device 32 schematically depicted in FIGS. 1 to 5, the first and second resonator elements 76 and 78 each open directly into the bore 70 and the bore 54, respectively.

In the embodiment of the injector device 32 depicted in FIGS. 1 to 5, the first resonator cavity 84 and the second resonator cavity 86 are configured in the form of hollow cuboids 88 and 90, respectively. In principle, they may have any form. In other embodiments, they are configured in the form of hollow cylinders or in the form of hollow spheres.

Further, the first resonator elements 76 and the first collection space 28 are fluidically connected to one another by way of first flushing channels 92.

Further, the second resonator elements 78 and the second collection space 30 are also each fluidically connected to one another by way of a respective second flushing channel 94.

The first flushing channel 92 defines a first flushing channel longitudinal axis 96. The second flushing channel 94 defines a second flushing channel longitudinal axis 98.

The first flushing channel longitudinal axis 96 and the longitudinal axis 16 extend in parallel or substantially in parallel to one another. The second flushing channel longitudinal axis 98 and the longitudinal axis 16 also extend in parallel or substantially in parallel to one another.

In the embodiment of the injector device 32 depicted in FIGS. 1 to 5, the first resonator elements 76 are each associated with a first injection element 34. The second resonator elements 78 are each associated with a second injection element 36.

In total, the described embodiment of the injector device 32 comprises nineteen respective first and second injection elements 34, 36, and therefore a plurality of respective first and second injection elements 34, 36.

As schematically depicted in FIG. 2, the fluidic oxidizing agent 100 flows from the first collection space 28 through the bore 70 forming a throttle into the injection sleeve 48, exits at the end 66 thereof and flows into the combustion chamber 12. The fluidic fuel 102 flows from the second collection space 30 through the annular spaces 64 into the combustion chamber 12 and mixes with the fluidic oxidizing agent 100 upon exiting the second injection elements 36.

The fluidic oxidizing agent 100 can also flow through the first flushing channels 92 into the first resonator elements 76. The conditions prevailing in the first injection element 34 and in the first resonator element 76 are thereby identical in each case.

The fluidic fuel 102 flows through the second flushing channels 94 into the second resonator elements 78 so that here, too, the conditions in the fluidic fuel 102 are identical both in the second resonator element 78 and in the second injection element 36.

As described above, an adaptation of the respective resonator elements 76, 78 to eigenfrequencies of the injection elements 34, 36 can take place independently of operating conditions of the engine device 10.

FIGS. 6 to 12 show schematically a further embodiment of an engine device 10. Identical elements and components of the embodiment of the engine device 10 depicted in FIGS. 6 to 12 are provided with the same reference numerals that serve to denote elements and components of the engine device 10 schematically depicted in FIGS. 1 to 5.

FIG. 6 shows schematically a longitudinal cut view of the engine device 10 in the region of the injector device 32. The embodiment of the injector device 32 depicted in FIG. 6 differs from the injector device 32 of the embodiment depicted in FIGS. 1 to 5 in particular in that the first resonator elements 76 do not open directly into the associated bore 70, but rather are fluidically connected thereto by way of a first resonator channel 104.

Furthermore, the second injection element 36 in turn is formed by the bore 54 in the injection head 52, the bore 54 tapering in inner diameter in a single stage after approximately two thirds of its length, commencing from the second collection space 30, thereby forming a throttle in the face wall 24.

In the embodiment of the injector device 32 depicted in FIGS. 6 to 12, no second resonator elements 78 are provided. In a further embodiment of the engine device 10 that is not depicted and is otherwise configured identically to the engine device 10 in accordance with FIGS. 6 to 12, second resonator channels 106 are provided that fluidically connect the second resonator elements 78 and the associated second injection elements 36 to one another. For illustrative purposes, an optional resonator element 78, shown in FIG. 6 as an example with dashes, which is fluidically connected to the second injection element 36 by way of the associated second resonator channel 106, also shown with dashes. The second resonator element 78 may, as shown with dashes in FIG. 6, be further fluidically connected to the second collection space 30 by way of the optional flushing channel 94.

The first resonator channel 104 defines a first resonator channel volume, which is smaller than the first resonator volume. Further, the second resonator channel 106 defines a second resonator channel volume, which is smaller than the second resonator volume.

Further, in one embodiment of the engine device 10, the first flushing channel 92 defines a first flushing channel cross-sectional area, which is smaller than a first resonator channel cross-sectional area defined by the first resonator channel 104.

In one embodiment of the engine device 10, a second flushing channel cross-sectional area defined by the second flushing channel 94 is smaller than a second resonator channel cross-sectional area defined by the second resonator channel 106.

The first resonator elements 76 and the second resonator elements 78 of the described embodiments of engine devices 10 are configured in the form of Helmholtz resonators.

In other embodiments of engine devices 10, they are configured in the form of λ/4 resonators.

In further embodiments of engine devices 10, the first and second resonator elements 76, 78 may be partially configured in the form of Helmholtz resonators and partially in the form of λ/4 resonators.

In one embodiment of an injector device 32, the first resonator elements 76 have different forms. Thus, in the embodiment depicted in FIGS. 6 to 12, a total of 42 first injection elements 34 are formed, of which 24 are arranged on an outer circle 59, 12 on a middle circle 58, and six on an inner circle 56. In FIG. 12, formed in the injector plate 50, which can also be referred to as a throttle plate, are first resonator elements 76a, 76b, 76c, 76d, and 76e, a first resonator element 76a or 76b being associated with the first injection elements 34 of the circle 59, a first resonator element 76c or 76d being associated with each first injection element 34 of the second circle 58, and a first resonator element 76e being associated with each first injection element 34 of the third circle 56.

The resonator elements 76a, 76b, 76c, 76d, and 76e thus have different forms and different first resonator volumes.

As a result of the different configuration of the first resonator elements 76a, 76b, 76c, 76d, and 76e, same are adapted to different eigenfrequencies of the first injection elements 34 associated therewith. In the embodiment of the injector device 32 depicted in FIGS. 6 to 12, the first resonator elements 76a and 76b are adapted to a second normal mode (2L) of the first injection elements 34, which couples with a first tangential mode of the combustion chamber 12 at about 10 kHz.

The first resonator elements 76c and 76d, on the other hand, are adapted to the third natural mode (3L) of the first injection elements 34, which couples with a second tangential mode of the combustion chamber 12 at about 15 kHz.

The first resonator elements 76e are adapted to the fourth normal mode (4L) of the first injection elements 34, which couples with a first radial mode of the combustion chamber 12 at about 20 kHz.

The first resonator elements 76a, 76b, 76c, 76d and 76e are each fluidically connected to the first collection space 28 by way of respective flushing channels 92a, 92b, and 92c.

The injector plate 50 is screwed to the injector element holder 46 with screws 108. Blind holes 112 provided with an internal thread 110 are formed in the injector element holder 46. The internal threads 110 correspond to external threads 114 of the screws 108.

In addition, formed in the injection plate 50 are bores 124 with set-back portions that can be passed through by the part of the screws 108 provided with the external thread 114.

The blind holes 112 are arranged annularly on a circle 116 that is formed between the circles 58 and 59 concentrically to the longitudinal axis 16.

The first resonator elements 76a and 76b, which are fluidically connected to the first injection elements 34 of the outermost circle 59, differ in their form but not in their adaptation to the particular eigenfrequency of the first injection element 34 of the outermost circle 59.

The first resonator elements 76c and 76d also differ from one another in their form. However, these too are each adapted to the same eigenfrequency of the first injection element 34 of the middle circle 58.

The different configuration of the first resonator elements 76a and 76b and 76c and 76d is due to the limited spatial situation, which does not allow for only three different first resonator elements 76 to be provided.

The first resonator elements 76 are each arranged or formed in the region of an inlet 118 of the first injection element 34 pointing in the direction toward the first collection space 28.

The second resonator elements 78 are arranged or formed in the region of an inlet 120 of the second injection element 36 pointing in the direction toward the second collection space 30.

In the described embodiments of injector devices 32, the first resonator elements 76 are arranged or formed in the injector plate 50. The second resonator elements 78 are arranged or formed in the face wall 24, which forms a second injector plate 122. The injector plates 50 and 122 are arranged or formed in parallel to one another and extend transversely, namely perpendicularly, to the longitudinal axis 16.

The injector plate 50 is configured in the form of a throttle plate. As described, the bore 70 in the region of the inlet 118 of the first injection element 34 forms a first throttle element, which defines a smaller flow cross section than the remaining part of the first injection element 34.

A further embodiment of an injector plate 50 is schematically depicted in FIGS. 13 and 14.

In the embodiment of the injector plate 50 of FIGS. 13 and 14, two first resonator elements 76a and 76b are indicated schematically. The resonator element 76a is fluidically connected to a total of three first injection elements 34 by way of three first resonator channels 104. Further, the first resonator element 76a is fluidically connected to the first collection space 28 by way of a flushing channel 92.

The first resonator element 76b schematically depicted in FIG. 14 is fluidically connected to two first injection elements 34 by way of two first resonator channels 104.

In principle, first and second resonator elements 76 and 78 may be associated with only one injection element 34 in exemplary embodiments. In other embodiments of injector devices 32, first resonator elements 76 and second resonator elements 78 may be associated with two, three, or more first and second injection channels 34, 36, respectively. Very compact injector plates 50 can be formed in this way.

Schematically depicted in FIG. 15 is the maximum pressure in the first injection element 34 and in the associated resonator element 76 at the respective eigenfrequency of the overall geometry of the injection elements 34. It can be clearly seen on the basis of this pressure distribution that a pressure peak is achieved in the second normal mode of the first injection element 34 and at the same time a wide frequency range of the first injection element 34 is dampened.

The dividing wall 26 of the engine device 10 is subjected to less thermal stress than the combustion chamber wall 14. This makes it possible to make the injector plate 50 out of rust-free stainless steel or nickel-based alloys.

In one embodiment, the injector plate 50 is formed by an additive manufacturing process. In particular, selective laser melting can be used here. This enables highly complex structures of the injector plate, in particular for forming the first resonator elements 76.

Schematically depicted in FIG. 16 is an embodiment of a spacecraft 126. It comprises one of the engine devices 10 described above as well as a fuel tank 128 for accommodating a fluidic, in particular liquid, fuel 102 and an oxidizing agent tank 130 for accommodating a fluidic, in particular liquid, oxidizing agent 100. The oxidizing agent 100 may be, in particular, liquid oxygen.

The fuel tank 128 is configured to accommodate a fluidic fuel, for example a liquid fuel in the form of hydrogen or methane.

The oxidizing agent tank 130 is fluidically connected to the first collection space 28 by way of a fluid conduit 132. The fuel tank 128 is connected to the second collection space 30 by way of a further fluid conduit 134.

FIG. 17 shows schematically an embodiment of an aircraft 136. It comprises a fuel tank 128 as well as an engine device 10 that is fluidically connected to the fuel tank 128 by way of a fluid conduit 134.

An oxidizing agent tank is not absolutely necessary in the case of the aircraft 136 if the aircraft 136 travels in regions of the atmosphere in which sufficient atmospheric oxygen is available to serve as an oxidizing agent for fuel 102 carried in the fuel tank 128 in the aircraft 136.

REFERENCE NUMERAL LIST 10 engine device
12 combustion chamber
14 combustion chamber wall
16 longitudinal axis
18 neck
20 outlet
22 nozzle
24 face wall
26 dividing wall
28 first collection space
30 second collection space
32 injector device
34 first injection element
36 second injection element
38 first fluid channel
40 second fluid channel
42 first injection element longitudinal axis
44 second injection element longitudinal axis
46 injection element holder
48 injector sleeve
50 injector plate
52 injection head
54 bore
56 circle
58 circle
59 circle
60 inner diameter
62 outer diameter
64 annular space
66 end
68 end
70 bore
72 inner diameter
74 inner diameter
76, 76a, 76b, 76c, 76d, 76e first resonator element
78 second resonator element
80 first resonator element longitudinal axis
82 second resonator element longitudinal axis
84 first resonator cavity
86 second resonator cavity
88 cuboid
90 cuboid
92, 92a, 92b, 92c first flushing channel
94 second flushing channel
96 first flushing channel longitudinal axis
98 second flushing channel longitudinal axis
100 oxidizing agent
102 fuel
104, 104a, 104b, 104c, 104d, 104e first resonator channel
106 second resonator channel
108 screws
110 internal thread
112 blind hole
114 external thread
116 circle
118 inlet
120 inlet
122 second injector plate
124 bore
126 spacecraft
128 fuel tank
130 oxidizing agent tank 132 fluid conduit
134 fluid conduit
136 aircraft

What is claimed is:

1. An injector device for an engine device for introducing a fluidic fuel and a fluidic oxidizing agent into a combustion chamber of the engine device, which injector device defines a longitudinal axis and comprises at least one first injection element, which is configured in the form of a first fluid channel for fluidically connecting a first collection space for the fluidic oxidizing agent and the combustion chamber, and at least one second injection element, which is configured in the form of a second fluid channel for fluidically connecting a second collection space for the fluidic fuel and the combustion chamber, wherein at least one of at least one first resonator element is associated with the at least one first injection element and at least one second resonator element is associated with the at least one second injection element, and wherein at least one of the at least one first resonator element is adapted to an eigenfrequency of the associated at least one first injection element and the at least one second resonator element is adapted to an eigenfrequency of the associated at least one second injection element, wherein at least one of:

the at least one first resonator element and the first collection space are fluidically connected to one another by way of a first flushing channel, so that the fluid flowing through the at least one first injection element also flows at a flow speed through the at least one first resonator element, thereby ensuring that the same conditions prevail in the at least one first resonator element at any one time as in the at least one first injection element to be dampened, and the at least one second resonator element and the second collection space are fluidically connected to one another by way of a second flushing channel, so that the fluid flowing through the at least one second injection element also flows at a flow speed through the at least one second resonator element, thereby ensuring that the same conditions prevail in the at least one second resonator element at any one time as in the at least one second injection element to be dampened.

2. The injector device in accordance with claim 1, wherein at least one of:
a) the at least one of the at least one first resonator element is fluidically connected to the at least one first injection element,
the at least one second resonator element is fluidically connected to the at least one second injection element, and
b) at least one of the at least one first resonator element comprises a first resonator cavity, which defines a first resonator volume, and wherein a first resonator channel fluidically connects the at least one first injection element and the first resonator cavity, and
the at least one second resonator element comprises a second resonator cavity, which defines a second resonator volume, and wherein a second resonator channel fluidically connects the at least one second injection element and the second resonator cavity.

3. The injector device in accordance with claim 1, wherein at least one of:
a) the at least one first injection element defines a first injection element longitudinal axis, and b) the at least one second injection element defines a second injection element longitudinal axis.

4. The injector device in accordance with claim 1, wherein at least one of:
a) at least one of the at least one first resonator element defines a first resonator element longitudinal axis and the at least one second resonator element defines a second resonator element longitudinal axis,
and
b) the at least one first injection element and the at least one second injection element are arranged or formed coaxially to one another.

5. The injector device in accordance with claim 1, wherein at least one of:
a) at least one of the at least one first flushing channel defines a first flushing channel longitudinal axis, and
the at least one second flushing channel defines a second flushing channel longitudinal axis,
and
b) at least one of a first flushing channel cross-sectional area defined by the at least one first flushing channel is smaller than a first resonator channel cross-sectional area defined by the first resonator channel, and
a second flushing channel cross-sectional area defined by the at least one second flushing channel is smaller than a second resonator channel cross-sectional area defined by the second resonator channel.

6. The injector device in accordance claim 1, wherein at least one of:
a) at least one of the at least one first resonator element and the at least one second resonator element is configured in the form of a Helmholtz resonator or in the form of a $\lambda/4$ resonator,
and
b) at least one of the at least one first resonator element is associated with at least one first injection element and the at least one second resonator element is associated with at least one second injection element.

7. The injector device in accordance with claim 1, wherein the injector device comprises at least one of a plurality of first injection elements and a plurality of second injection elements.

8. The injector device in accordance with claim 1, wherein at least one of:
a) the at least one first resonator element is arranged or formed in the region of an inlet of the at least one first injection element facing in the direction toward the first collection space,
and
b) the at least one second resonator element is arranged or formed in the region of an inlet of the at least one second injection element facing in the direction toward the second collection space.

9. The injector device in accordance with claim 1, wherein the injector device comprises a first injector plate and a second injector plate, wherein at least one of:
a) the at least one first resonator elements are arranged or formed in the first injector plate,
and
b) the at least one second resonator elements are arranged or formed in the second injector plate.

10. The injector device in accordance with claim 9, wherein at least one of:
a) the first injector plate and the second injector plate are arranged or formed in parallel to one another,
and b) the second collection space is arranged or formed between the first injector plate and the second injector plate, and c) the first injector plate is configured in the form of a throttle plate and wherein a first throttle element is associated with the at least one first injection element in the region of the inlet thereof, said throttle element defining a smaller flow cross section than the at least one first injection element, and wherein the first throttle element is arranged or formed in or on the throttle plate.

11. The injector device in accordance with claim 1, wherein the at least one first injection element is arranged on a plate-shaped injector element holder and is configured in the form of an injector sleeve.

12. The injector device in accordance with claim 11, wherein the injector element holder on the one hand abuts in surface-to-surface contact against the first injector plate and on the other hand delimits the second collection space.

13. The injector device in accordance with claim 1, wherein the at least one second injection element is arranged or formed on or in an injection head.

14. The injector device in accordance with claim 1, wherein the at least one second injection element tapers in cross section in a single stage to form a second throttle element.

15. An engine device for at least one of an aircraft and a spacecraft, which engine device comprises a combustion chamber with a nozzle and comprises an injector device arranged opposite the nozzle, wherein the injector device is configured for introducing a fluidic fuel and a fluidic oxidizing agent into the combustion chamber, which injector device defines a longitudinal axis and comprises at least one first injection element, which is configured in the form of a first fluid channel for fluidically connecting a first collection space for the fluidic oxidizing agent and the combustion chamber, and at least one second injection element, which is configured in the form of a second fluid channel for fluidically connecting a second collection space for the fluidic fuel and the combustion chamber, wherein at least one of at least one first resonator element is associated with the at least one first injection element and wherein at least one second resonator element is associated with the at least one second injection element, and wherein at least one of the at least one first resonator element is adapted to an eigenfrequency of the associated at least one first injection element and the at least one second resonator element is adapted to an eigenfrequency of the associated at least one second injection element, wherein at least one of:

the at least one first resonator element and the first collection space are fluidically connected to one another by way of a first flushing channel, so that the fluid flowing through the at least one first injection element also flows at a flow speed through the at least one first resonator element, thereby ensuring that the same conditions prevail in the at least one first resonator element at any one time as in the at least one first injection element to be dampened, and the at least one second resonator element and the second collection space are fluidically connected to one another by way of a second flushing channel, so that the fluid flowing through the at least one second injection element also flows at a flow speed through the at least one second resonator element, thereby ensuring that the same conditions prevail in the at least one second resonator element at any one time as in the at least one second injection element to be dampened.

16. The engine device in accordance with claim 15, wherein at least one of:

a) the engine device is configured in the form of a rocket engine, and b) the combustion chamber comprises a face wall opposite the nozzle and at least part of the injector device is arranged or formed in the face wall, and c) the engine device comprises at least one collection space, which is delimited by a collection space face wall.

17. An aircraft or spacecraft with an engine device and a fuel tank for accommodating a fluidic fuel, wherein the engine device comprises a combustion chamber with a nozzle and comprises an injector device arranged opposite the nozzle, wherein the injector device is configured for introducing the fluidic fuel and a fluidic oxidizing agent into the combustion chamber, which injector device defines a longitudinal axis and comprises at least one first injection element, which is configured in the form of a first fluid channel for fluidically connecting a first collection space for the fluidic oxidizing agent and the combustion chamber, and at least one second injection element, which is configured in the form of a second fluid channel for fluidically connecting a second collection space for the fluidic fuel and the combustion chamber, wherein at least one of at least one first resonator element is associated with the at least one first injection element and at least one second resonator element is associated with the at least one second injection element, and wherein at least one of the at least one first resonator element is adapted to an eigenfrequency of the associated at least one first injection element and the at least one second resonator element is adapted to an eigenfrequency of the associated at least one second injection element, wherein at least one of:

the at least one first resonator element and the first collection space are fluidically connected to one another by way of a first flushing channel, so that the fluid flowing through the at least one first injection element also flows at a flow speed through the at least one first resonator element, thereby ensuring that the same conditions prevail in the at least one first resonator element at any one time as in the at least one first injection element to be dampened, and the at least one second resonator element and the second collection space are fluidically connected to one another by way of a second flushing channel, so that the fluid flowing through the at least one second injection element also flows at a flow speed through the at least one second resonator element, thereby ensuring that the same conditions prevail in the at least one second resonator element at any one time as in the at least one second injection element to be dampened.

18. The aircraft or spacecraft in accordance with claim 17, wherein at least one of:

a) the fuel tank is configured to accommodate liquid hydrogen or liquid methane and b) the aircraft or spacecraft comprises an oxidizing agent tank for accommodating a fluidic oxidizing agent.

19. A method for operating an engine device, in which method a fluidic fuel and a fluidic oxidizing agent are introduced with an injector device into a combustion chamber of the engine device, which injector device comprises at least one first injection element for fluidically connecting a first collection space for the fluidic oxidizing agent and the combustion chamber, and at least one second injection element for fluidically connecting a second collection space for the fluidic fuel and the combustion chamber, wherein at least one of acoustic natural vibrations in the at least one first injection element and/or that acoustic natural vibrations in the at least one second injection element are dampened, wherein at least one of at least one first resonator element is associated with the at least one first injection element and at least one second resonator element is associated with the at least one second injection element, and wherein at least one of the at least one first resonator element is adapted to an eigenfrequency of the associated at least one first injection element and the at least one second resonator element is adapted to an eigenfrequency of the associated at least one second injection element, wherein at least one of:

the at least one first resonator element and the first collection space are fluidically connected to one another by way of a first flushing channel, so that the fluid flowing through the at least one first injection element also flows at a flow speed through the at least one first resonator element, thereby ensuring that the same conditions prevail in the at least one first resonator element at any one time as in the at least one first injection element to be dampened, and the at least one second resonator element and the second collection space are fluidically connected to one another by way of a second flushing channel, so that the fluid flowing through the at least one second injection element also flows at a flow speed through the at least one second resonator element, thereby ensuring that the same conditions prevail in the at least one second resonator element at any one time as in the at least one second injection element to be dampened.

* * * * *

UNITED STATES PATENT AND TRADEMARK OFFICE
CERTIFICATE OF CORRECTION

PATENT NO. : 11,906,166 B2
APPLICATION NO. : 17/450897
DATED : February 20, 2024
INVENTOR(S) : Armbruster et al.

It is certified that error appears in the above-identified patent and that said Letters Patent is hereby corrected as shown below:

In the Claims

Column 19, Line 20: "with the at least one second injection element, and" should read -- with the at least one second injection element, --

Column 21, Line 43: "and wherein at least one second resonator element is" should read -- and at least one second resonator element is --

Column 23, Line 11: "injection element and/or that acoustic natural vibrations in" should read -- injection element and acoustic natural vibrations in --

Column 23, Line 16: "with the at least one second injection element, and" should read -- with the at least one second injection element, --

Signed and Sealed this
Ninth Day of April, 2024

*Katherine Kelly Vidal*

Katherine Kelly Vidal
*Director of the United States Patent and Trademark Office*